(12) United States Patent
Suzuki et al.

(10) Patent No.: US 12,552,414 B2
(45) Date of Patent: Feb. 17, 2026

(54) VEHICLE PLATFORM, VEHICLE CONTROL INTERFACE BOX, AND AUTONOMOUS DRIVING SYSTEM

(71) Applicant: TOYOTA JIDOSHA KABUSHIKI KAISHA, Toyota (JP)

(72) Inventors: Ikuma Suzuki, Okazaki (JP); Mitsuhiro Miura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 116 days.

(21) Appl. No.: 18/540,593

(22) Filed: Dec. 14, 2023

(65) Prior Publication Data
US 2024/0253666 A1    Aug. 1, 2024

(30) Foreign Application Priority Data
Jan. 26, 2023   (JP) ................. 2023-010060

(51) Int. Cl.
*B60W 60/00*   (2020.01)
*B60R 16/023*  (2006.01)
*B60W 10/04*   (2006.01)
*B60W 10/18*   (2012.01)

(52) U.S. Cl.
CPC ... *B60W 60/00186* (2020.02); *B60R 16/0231* (2013.01); *B60W 10/04* (2013.01); *B60W 10/182* (2013.01)

(58) Field of Classification Search
CPC ........... B60W 60/00186; B60W 10/04; B60W 10/182; B60W 50/0205; B60W 50/029; B60W 60/001; B60W 50/00; B60W 2050/0001; B60R 16/0231; B60R 16/023
See application file for complete search history.

(56) References Cited

U.S. PATENT DOCUMENTS

| | | | |
|---|---|---|---|
| 8,412,449 B2* | 4/2013 | Trepagnier | G05D 1/0248 701/28 |
| 9,580,080 B1* | 2/2017 | Letwin | B60W 50/082 |
| 11,036,233 B2* | 6/2021 | Costa | G05D 1/65 |
| 11,673,574 B2* | 6/2023 | Suzuki | B60W 60/0025 701/23 |
| 11,891,055 B2* | 2/2024 | Suzuki | B60W 30/181 |
| 12,128,922 B2* | 10/2024 | Winter | B60W 60/0011 |
| 2021/0237765 A1* | 8/2021 | Ando | B60R 16/04 |
| 2022/0242415 A1* | 8/2022 | Nice | B60W 40/04 |

(Continued)

FOREIGN PATENT DOCUMENTS

JP    2018-132015 A    8/2018

*Primary Examiner* — Masud Ahmed
(74) *Attorney, Agent, or Firm* — Oliff PLC

(57) ABSTRACT

A VP is configured such that an ADS is mountable thereon. The VP includes a base vehicle and a VCIB. The VCIB includes a VCIB that interfaces between the base vehicle and the ADS through a communication bus and a VCIB that interfaces between the base vehicle and the ADS through a communication bus. Each of the VCIB and the VCIB outputs a signal and a signal. The signal indicates a status as to whether or not a fault regarding a functionality in an autonomous mode in the VP occurs. The signal indicates a status of a vehicle-mounted system according to a failure point in the VP. The vehicle-mounted system is a wheel lock control system, a direction control system, or a propulsive system.

6 Claims, 20 Drawing Sheets

(56) References Cited

U.S. PATENT DOCUMENTS

| | | | |
|---|---|---|---|
| 2023/0119228 A1* | 4/2023 | Ando | B60W 60/00 701/23 |
| 2023/0192129 A1* | 6/2023 | Winter | G05D 1/2249 701/24 |

* cited by examiner

| FAILURE POINT | MAIN | | Capability |
|---|---|---|---|
| | VP_Autonomy_Fault (V1 (V1A)) | WheelLock_Control_Degradation_Modes (V2 (V2A)) | |
| ⑬/⑭ (CP1) | 1 | 1 | — |
| ⑲ (60) | 1 | 1 | — |
| ⑰/⑱ (CP3) | 0 | 0 | — |
| ㉚ (342) | 1 | 3 | — |
| ㉒ (CP4) | 1 | 3 | — |
| ⑮/⑯ (CP2) | 0 | 0 | — |
| ㉛ (341) | 1 | 2 | — |

| FAILURE POINT | SUB | | Capability |
|---|---|---|---|
| | VP_Autonomy_Fault (V1 (V1B)) | WheelLock_Control_Degradation_Modes (V2 (V2B)) | |
| ⑬/⑭ (CP1) | 0 | 0 | — |
| ⑲ (60) | 1 | 2 | — |
| ⑰/⑱ (CP3) | 1 | 2 | — |
| ㉚ (342) | 1 | 3 | — |
| ㉒ (CP4) | 1 | 0 | — |
| ⑮/⑯ (CP2) | 1 | 3 | — |
| ㉛ (341) | 1 | 2 | — |

FIG.6

| FAILURE POINT | MAIN | | | | SUB | | 430 111M |
|---|---|---|---|---|---|---|---|
| | VP_Autonomy_Fault (V1A) | WheelLock_Control_Degradation_Modes (V2A) | Capability | VP_Autonomy_Fault (V1B) | WheelLock_Control_Degradation_Modes (V2B) | Capability | |
| ⑬ / ⑭ (CP1) | 1 | 1 | -- | 0 | 0 | -- | |
| ⑲ (60) | 1 | 1 | -- | 1 | 2 | -- | |
| ⑰ / ⑱ (CP3) | 0 | 0 | -- | 1 | 2 | -- | |
| ㉚ (342) | 1 | 3 | -- | 1 | 3 | -- | |
| ㉒ (CP4) | 1 | 3 | -- | 1 | 0 | -- | |
| ⑮ / ⑯ (CP2) | 0 | 0 | -- | 1 | 3 | -- | |
| ㉛ (341) | 1 | 2 | -- | 1 | 2 | -- | |

FIG.11

| FAILURE POINT | MAIN | | | SUB | | | 111M |
|---|---|---|---|---|---|---|---|
| | VP_Autonomy_Fault (V1A) | Direction_Control_Degradation_Modes (V2A) | Capability | VP_Autonomy_Fault (V1B) | Direction_Control_Degradation_Modes (V2B) | Capability | |
| ⑬/⑭ (CP1) | 1 | 1 | - | 0 | 0 | - | |
| ⑲/㉖ (60, 344) | 1 | 1 | - | 1 | 1 | - | |

530

| FAILURE POINT | MAIN | | Capability |
|---|---|---|---|
| | VP_Autonomy_Fault (V1 (V1A)) | Propulsive_System_Degradation_Modes (V2 (V2A)) | |
| ⑬ / ⑭ (CP1) | 1 | 1 | — |
| ⑲ / ㉕ (60, 345) | 1 | 1 | — |
| ⑰ / ⑱ (CP3) | 0 | 0 | — |

FIG.15

| FAILURE POINT | MAIN | | | SUB | | |
|---|---|---|---|---|---|---|
| | VP_Autonomy_Fault (V1A) | Propulsive_System_Degradation_Modes (V2A) | Capability | VP_Autonomy_Fault (V1B) | Propulsive_System_Degradation_Modes (V2B) | Capability |
| ⑬ / ⑭ (CP1) | 1 | 1 | - | 0 | 0 | - |
| ⑲ / ㉕ (60, 345) | 1 | 1 | - | 1 | 1 | - |
| ⑰ / ⑱ (CP3) | 0 | 0 | - | 1 | 1 | - |

| #1: CREATING A DRIVING PLAN | THE ADS CREATES A DRIVING PLAN. |
|---|---|
| #2: EXTRACTING PHYSICAL QUANTITIES | THE ADS EXTRACTS PHYSICAL CONTROL QUANTITIES FROM THE DRIVING PLAN. E.G. PHYSICAL CONTROL QUANTITIES := ACCELERATION, ROAD WHEEL ANGLE, ETC. |
| #3: SPLIT OF PHYSICAL QUANTITIES | THE ADS SPLITS THEM BY DEFINED CYCLE TIME OF EACH API. |
| #4: : EXECUTION OF AN API WITH THE VALUE | THE ADS EXECUTES AN API WITH THE SPLIT PHYSICAL QUANTITY. |
| #5: CALCULATION OF ITS BEHAVIOR | THE ADS CALCULATES THE VEHICLE BEHAVIOR, AND RECREATES A DRIVING PLAN TO WHICH THE VEHICLE BEHAVIOR IS REFLECTED |

VEHICLE PLATFORM, VEHICLE CONTROL INTERFACE BOX, AND AUTONOMOUS DRIVING SYSTEM

CROSS REFERENCE TO RELATED APPLICATIONS

This nonprovisional application is based on Japanese Patent Application No. 2023-010060 filed with the Japan Patent Office on Jan. 26, 2023, the entire contents of which are hereby incorporated by reference.

BACKGROUND

Field

The present disclosure relates to a vehicle platform, a vehicle control interface box, and an autonomous driving system.

Description of the Background Art

Japanese Patent Laying-Open No. 2018-132015 discloses a vehicle on which an autonomous driving system is mounted. The autonomous driving system carries out autonomous driving control of a vehicle in a concentrated manner.

SUMMARY

An autonomous driving system developed by an autonomous driving system company may externally be attached. In this case, autonomous driving of the vehicle is carried out in accordance with a command from the externally attached autonomous driving system. In such a vehicle, an interface for various requests and signals exchanged between the externally attached autonomous driving system and the vehicle is important. The requests and the signals are interfaced, for example, by a vehicle control interface box. The vehicle control interface box may include a main vehicle interface box and a sub vehicle interface box.

When there is a failure point in a vehicle, the autonomous driving system preferably determines the failure point and then transmits a request to the vehicle. If the autonomous driving system is unable to determine the failure point, on the other hand, it may not be able to appropriately transmit the request to the vehicle. For example, in an example where there is a failure point on a communication path to a specific vehicle-mounted system relating to autonomous driving, a request (command) from the autonomous driving system may disappear on the communication path and may not reach the vehicle-mounted system. Consequently, autonomous driving may not appropriately be carried out in accordance with the request from the autonomous driving system.

The present disclosure was made to solve the problem as described above, and an object thereof is to provide a vehicle, a vehicle control interface box, and an autonomous driving system that enable appropriate autonomous driving even when there is a failure point in a vehicle.

A vehicle platform in the present disclosure is configured such that an autonomous driving system is mountable thereon. The vehicle platform includes a vehicle and a vehicle control interface box. The vehicle control interface box interfaces between the vehicle and the autonomous driving system through a main bus and a sub bus. The vehicle includes a vehicle-mounted system connected to the vehicle control interface box. The vehicle control interface box includes a main vehicle control interface box that interfaces between the vehicle and the autonomous driving system through the main bus and a sub vehicle control interface box that interfaces between the vehicle and the autonomous driving system through the sub bus. Each of the main vehicle control interface box and the sub vehicle control interface box outputs a first signal and a second signal. The first signal indicates a status as to whether a fault regarding a functionality in an autonomous mode in the vehicle platform occurs. The second signal indicates a status of the vehicle-mounted system according to a failure point in the vehicle platform. The vehicle-mounted system is a wheel lock control system, a direction control system, or a propulsive system of the vehicle.

The first signal indicates a status (first status) as to whether or not a fault occurs and the second signal indicates a status (second status) of the vehicle-mounted system. These statuses vary depending on a location of the failure point. According to the configuration, the first signal and the second signal from the main vehicle control interface box and the first signal and the second signal from the sub vehicle control interface box are inputted to the autonomous driving system. The autonomous driving system is thus notified of the first status and the second status indicated by the first signal and the second signal, respectively, by the main vehicle control interface box and the first status and the second status indicated by the first signal and the second signal, respectively, by the sub vehicle control interface box. Consequently, the autonomous driving system can determine the location of the failure point in accordance with these four statuses and can appropriately transmit the request to the vehicle in accordance with a result of this determination. Therefore, even when there is a failure point in a vehicle, autonomous driving can appropriately be carried out.

In one aspect, the vehicle-mounted system is the wheel lock control system. The wheel lock control system includes an electric parking brake system and a parking lock system of the vehicle. The parking lock system is connected to the sub vehicle control interface box. The status of the wheel lock control system indicated by the second signal includes loss of a function of the wheel lock control system, a degraded operation of the electric parking brake system, and a degraded operation of the parking lock system.

In one aspect, the vehicle further includes a motion controller that communicates with each of the main vehicle control interface box, the sub vehicle control interface box, the electric parking brake system, and the parking lock system. The main vehicle control interface box is configured to communicate with each of the electric parking brake system and the parking lock system with the motion controller being interposed. The status of the wheel lock control system indicated by the second signal outputted from the main vehicle control interface box is the loss of the function when the failure point is located on a communication path between the main vehicle control interface box and the motion controller or in the motion controller, the degraded operation of the parking lock system when the failure point is located on a communication path between the motion controller and the parking lock system or in the parking lock system, or the degraded operation of the electric parking brake system when the failure point is located in the electric parking brake system.

In one aspect, the vehicle further includes a motion controller that communicates with each of the main vehicle control interface box, the sub vehicle control interface box, the electric parking brake system, and the parking lock system. The sub vehicle control interface box is configured to communicate with each of the electric parking brake system and the parking lock system with the motion controller being interposed. The status of the wheel lock control system indicated by the second signal outputted from the sub vehicle control interface box is the degraded operation of the electric parking brake system when the failure point is located in the motion controller, on a communication path between the sub vehicle control interface box and the motion controller, or in the electric parking brake system, or the degraded operation of the parking lock system when the failure point is located in the parking lock system or on a communication path between the sub vehicle control interface box and the parking lock system.

A vehicle control interface box in the present disclosure interfaces between a vehicle included in a vehicle platform configured such that an autonomous driving system is mountable thereon and the autonomous driving system through a main bus and a sub bus. The vehicle includes a vehicle-mounted system connected to the vehicle control interface box. The vehicle control interface box includes a main vehicle control interface box that interfaces between the vehicle and the autonomous driving system through the main bus and a sub vehicle control interface box that interfaces between the vehicle and the autonomous driving system through the sub bus. Each of the main vehicle control interface box and the sub vehicle control interface box outputs a first signal and a second signal. The first signal indicates a status as to whether a fault regarding a functionality in an autonomous mode in the vehicle platform occurs. The second signal indicates a status of the vehicle-mounted system according to a failure point in the vehicle platform. The vehicle-mounted system is a wheel lock control system, a direction control system, or a propulsive system of the vehicle.

An autonomous driving system in the present disclosure is configured as being mountable on a vehicle platform. The vehicle platform includes a vehicle and a vehicle control interface box. The vehicle control interface box interfaces between the vehicle and the autonomous driving system through a main bus and a sub bus. The vehicle includes a vehicle-mounted system connected to the vehicle control interface box. The vehicle control interface box includes a main vehicle control interface box that interfaces between the vehicle and the autonomous driving system through the main bus and a sub vehicle control interface box that interfaces between the vehicle and the autonomous driving system through the sub bus. Each of the main vehicle control interface box and the sub vehicle control interface box outputs a first signal and a second signal. The first signal indicates a status as to whether a fault regarding a functionality in an autonomous mode in the vehicle platform occurs. The second signal indicates a status of the vehicle-mounted system according to a failure point in the vehicle platform. The vehicle-mounted system is a wheel lock control system, a direction control system, or a propulsive system of the vehicle. The autonomous driving system includes a computer, a first communication module, and a second communication module. The first communication module communicates with the main vehicle control interface box. The second communication module communicates with the sub vehicle control interface box. The computer is programmed to receive the first signal and the second signal of the main vehicle control interface box, through the first communication module from the main vehicle control interface box, and to receive the first signal and the second signal of the sub vehicle control interface box, through the second communication module from the sub vehicle control interface box.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIGS. 4 and 5 are each a diagram schematically showing data stored in a memory of the VCIB in the embodiment.

FIG. 6 is a diagram schematically showing data stored in a memory of the ADS in the embodiment.

FIG. 11 is a diagram schematically showing data stored in the memory of the ADS in the first modification.

FIG. 15 is a diagram schematically showing data stored in the memory of the ADS in the second modification.

FIG. 18 is a diagram showing a typical workflow in the ADS.

DESCRIPTION OF THE PREFERRED EMBODIMENTS

Figure 1:
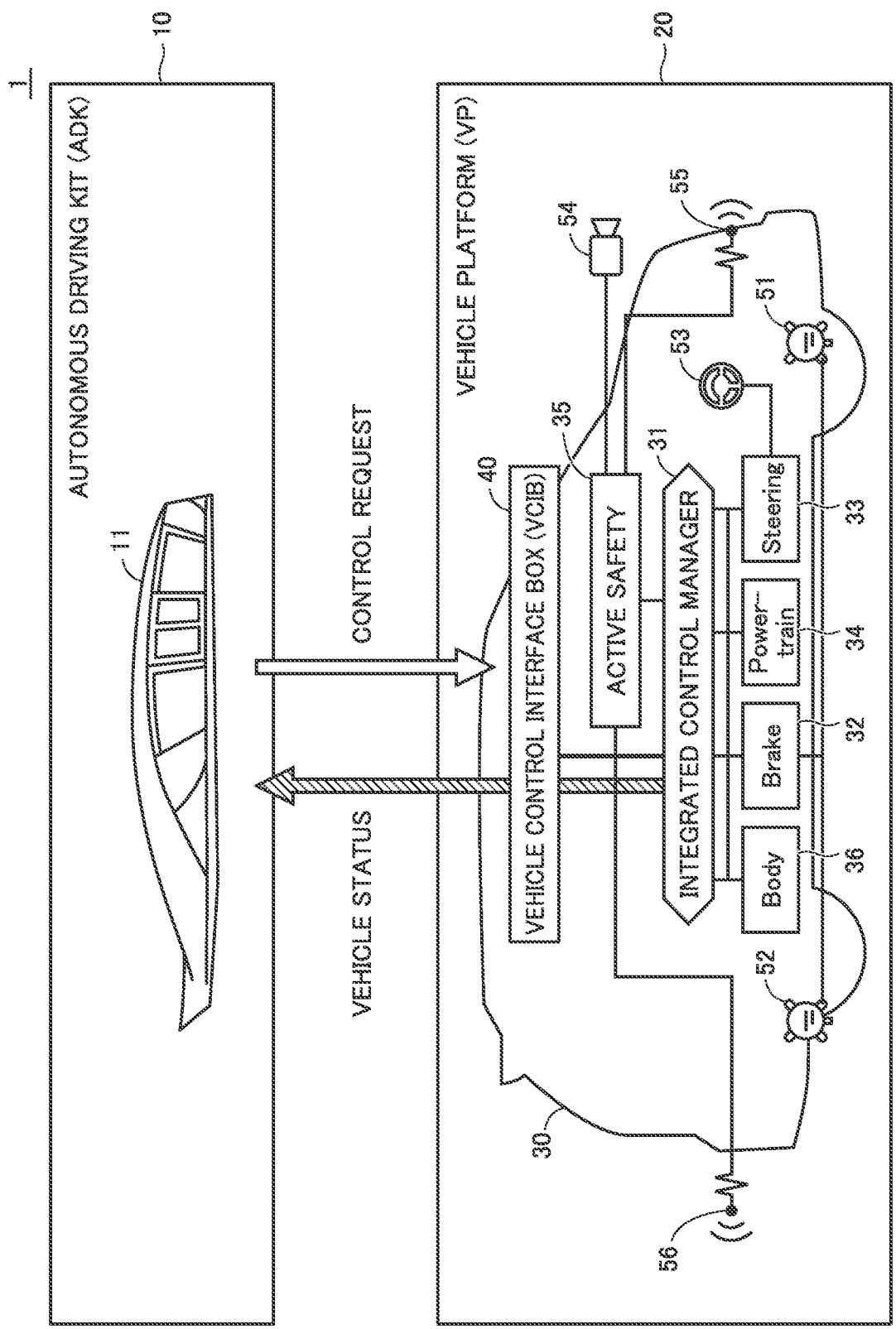
FIG. 1 is a diagram showing overview of a vehicle according to an embodiment.

An embodiment of the present disclosure will be described below in detail with reference to the drawings. The same or corresponding elements in the drawings have the same reference characters allotted and description thereof will not be repeated.

FIG. 1 is a diagram showing overview of a vehicle 1 according to an embodiment of this disclosure. Vehicle 1 includes an autonomous driving kit (ADK) 10 and a vehicle platform 20. ADK 10 is configured as being attachable to VP 20 (mountable on vehicle 1). ADK 10 and VP 20 are configured to communicate with each other through a vehicle control interface (a VCIB 40 which will be described later).

VP 20 can carry out autonomous driving in accordance with control requests from ADK 10. Though FIG. 1 shows ADK 10 at a position distant from VP 20, ADK 10 is actually attached to a rooftop or the like of VP 20. ADK 10 can also be removed from VP 20. While ADK 10 is not attached, VP 20 carries out travel control (travel control in accordance with an operation by a user) in a manual mode.

ADK 10 includes an autonomous driving system 11 for autonomous driving of vehicle 1. For example, ADS 11 creates a driving plan of vehicle 1. ADS 11 outputs various control requests for travel of vehicle 1 in accordance with the driving plan to VP 20 in accordance with an application program interface (API) defined for each control request. ADS 11 receives various signals indicating vehicle statuses (statuses of VP 20) from VP 20 in accordance with the API defined for each signal. Then, ADS 11 has the vehicle status reflected on the driving plan. A detailed configuration of ADS 11 will be described with reference to FIG. 2.

VP 20 includes a base vehicle 30 and a vehicle control interface box 40.

Base vehicle 30 carries out various types of vehicle control in accordance with a control request from ADK 10 (ADS 11). Base vehicle 30 includes various vehicle-mounted systems and various sensors for controlling base vehicle 30. More specifically, base vehicle 30 includes an integrated control manager 31, a brake system 32, a steering system 33, a powertrain system 34, an active safety system 35, a body system 36, wheel speed sensors 51 and 52, a pinion angle sensor 53, a camera 54, and radar sensors 55 and 56.

Integrated control manager 31 includes a processor such as a central processing unit (CPU) and a memory such as a read only memory (ROM) and a random access memory (RAM), although none of them is shown, and integrally controls the systems (brake system 32, steering system 33, powertrain system 34, active safety system 35, and body system 36) involved with operations of vehicle 1.

Brake system 32 is configured to control a braking apparatus provided in each wheel of base vehicle 30. The braking apparatus includes, for example, a disc brake system (not shown) that is operated with a hydraulic pressure regulated by an actuator.

Wheel speed sensors 51 and 52 are connected to brake system 32. Wheel speed sensor 51 detects a rotation speed of a front wheel of base vehicle 30 and outputs the detected rotation speed of the front wheel to brake system 32. Wheel speed sensor 52 detects a rotation speed of a rear wheel of base vehicle 30 and outputs the detected rotation speed of the rear wheel to brake system 32. Brake system 32 outputs to VCIB 40, the rotation speed of each wheel as one of pieces of information included in the vehicle statuses. Brake system 32 generates a braking command to a braking apparatus in accordance with a prescribed control request outputted from ADS 11 through VCIB 40 and integrated control manager 31. Brake system 32 controls the braking apparatus based on the generated braking command. Integrated control manager 31 can calculate a speed of vehicle 1 (vehicle speed) based on the rotation speed of each wheel.

Steering system 33 is configured to control a steering angle (wheel steer angle) of a steering wheel of vehicle 1 with a steering apparatus. The steering apparatus includes, for example, rack-and-pinion electric power steering (EPS) that allows adjustment of a steering angle by an actuator.

Pinion angle sensor 53 is connected to steering system 33. Pinion angle sensor 53 detects an angle of rotation of a pinion gear (a pinion angle) coupled to a rotation shaft of the actuator and outputs the detected pinion angle to steering system 33. Steering system 33 outputs to VCIB 40, the pinion angle as one of pieces of information included in the vehicle statuses. Steering system 33 generates a steering command to the steering apparatus in accordance with a prescribed control request outputted from ADS 11 through VCIB 40 and integrated control manager 31. Steering system 33 controls the steering apparatus based on the generated steering command.

Powertrain system 34 controls an electric parking brake (EPB) system 341 provided in at least one of a plurality of wheels, a parking lock (P-Lock) system 342 provided in a transmission of vehicle 1, and a propulsion system 343 including a shift apparatus (not shown) configured to allow selection of a shift range. A detailed configuration of powertrain system 34 will be described with reference to FIG. 2.

Active safety system 35 detects an obstacle (a pedestrian, a bicycle, a parked vehicle, a utility pole, or the like) in front or in the rear with the use of camera 54 and radar sensors 55 and 56. Active safety system 35 determines whether or not vehicle 1 may collide with the obstacle based on a distance between vehicle 1 and the obstacle and a direction of movement of vehicle 1. When active safety system 35 determines that there is possibility of collision, it outputs a braking command to brake system 32 through integrated control manager 31 so as to increase braking force.

Body system 36 is configured to control, for example, components such as a direction indicator, a horn, and a wiper (none of which is shown), depending on a state of travel or an environment around vehicle 1. Body system 36 controls each component in accordance with a prescribed control request outputted from ADS 11 through VCIB 40 and integrated control manager 31.

VCIB 40 is configured to communicate with ADS 11 over a controller area network (CAN). VCIB 40 receives various control requests from ADS 11 or outputs a vehicle status to ADS 11 by executing a prescribed API defined for each signal. When VCIB 40 receives the control request from ADK 10, it outputs a control command corresponding to the control request to a system corresponding to the control command through integrated control manager 31. VCIB 40 obtains various types of information on base vehicle 30 from various systems through integrated control manager 31 and outputs the status of base vehicle 30 as the vehicle status to ADS 11.

Vehicle 1 may be used as one of constituent elements of a mobility as a service (MaaS) system. The MaaS system includes, for example, a data server and a mobility service platform (MSPF) (neither of which is shown), in addition to vehicle 1.

The MSPF is an integrated platform to which various mobility services are connected. Autonomous driving related mobility services are connected to the MSPF. In addition to the autonomous driving related mobility services, mobility services provided by a ride-share company, a car-sharing company, a rent-a-car company, a taxi company, and an insurance company may be connected to the MSPF.

Vehicle 1 further includes a data communication module (DCM) (not shown) capable of wirelessly communicating with a data server. The DCM outputs vehicle information such as a speed, a position, or an autonomous driving state to the data server. The DCM receives from the autonomous driving related mobility services through the MSPF and the data server, various types of data for management of travel of an autonomous driving vehicle including vehicle 1 in the mobility services.

The MSPF publishes APIs for using various types of data on vehicle statuses and vehicle control necessary for development of ADS 11. Various mobility services can use various functions provided by the MSPF depending on service contents, by using the APIs published on the MSPF. For example, the autonomous driving related mobility services can obtain operation control data of vehicle 1 or information stored in the data server from the MSPF by using the APIs published on the MSPF. The autonomous driving related mobility services can transmit data for managing an autonomous driving vehicle including vehicle 1 to the MSPF by using the API.

Figure 2:
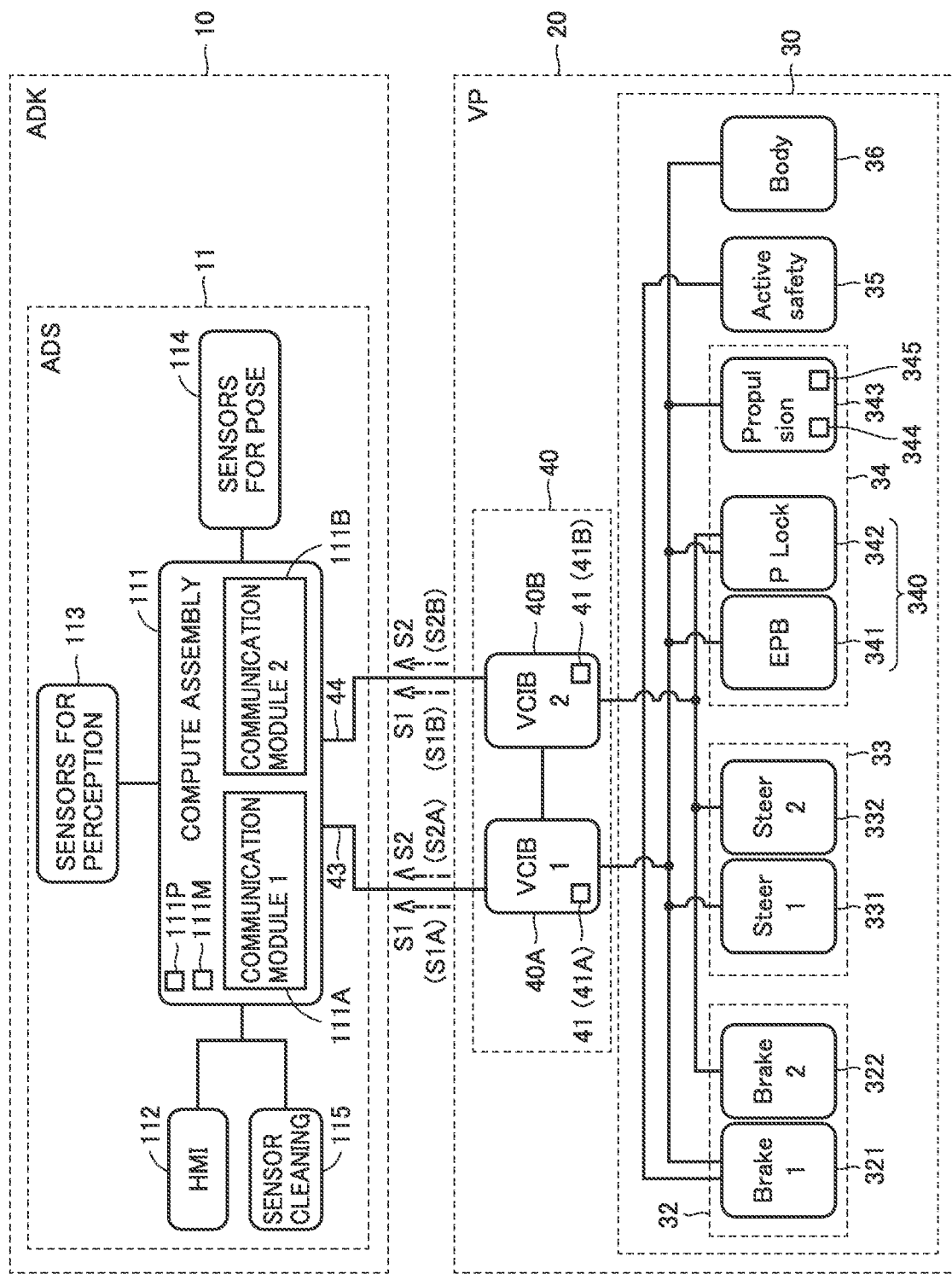
FIG. 2 is a diagram showing in detail, a configuration of an autonomous driving system (ADS), a vehicle control interface box (VCIB), and a vehicle platform (VP) according to the embodiment.

FIG. 2 is a diagram showing in detail, a configuration of ADS 11, VCIB 40, and VP 20 according to this embodiment. As shown in FIG. 2, ADS 11 includes a compute assembly 111, a human machine interface (HMI) 112, sensors for perception 113, sensors for pose 114, and a sensor cleaning 115.

Compute assembly 111 includes a processor 111P such as a CPU and a memory 111M such as a ROM and a RAM. A program executable by processor 111P is stored in memory 111M. During autonomous driving of vehicle 1, compute assembly 111 obtains information indicating an environment around vehicle 1 and information indicating a pose, a behavior, and a position of vehicle 1 from various sensors (which will be described later), and obtains a vehicle status from VP 20 through VCIB 40 and sets a next operation (acceleration, deceleration, or turning) of vehicle 1. Compute assembly 111 outputs various commands for realizing a next operation to VCIB 40. Compute assembly 111 further includes communication modules (each of which is also called a "vehicle interface module (VIM)" below) 111A and 111B. Communication modules 111A and 111B are each configured to communicate with VCIB 40. Specifically, communication modules 111A and 111B communicate with VCIBs 40A and 40B (both of which will be described later), respectively.

HMI 112 presents information to a user and accepts an operation by the user during autonomous driving, during driving requiring an operation by the user, or at the time of transition between autonomous driving and driving requiring an operation by the user. HMI 112 is constructed to be connected to an input and output apparatus (not shown) such as a touch panel display provided in base vehicle 30.

Sensors for perception 113 are sensors that perceive an environment around vehicle 1. Sensors for perception 113 include, for example, at least one of laser imaging detection and ranging (LIDAR), a millimeter-wave radar, and a camera (none of which is shown). The LIDAR measures a distance and a direction to an object, for example, by emitting laser beams of infrared pulses and detecting laser beams reflected by the object. The millimeter-wave radar measures a distance and a direction to an object by emitting millimeter waves and detecting millimeter waves reflected by the object. The camera is arranged, for example, on a rear side of a room mirror and shoots an image of the front of vehicle 1.

Sensors for pose 114 are sensors that detect a pose, a behavior, or a position of vehicle 1. Sensors for pose 114 include, for example, an inertial measurement unit (IMU) and a global positioning system (GPS) (neither of which is shown). The IMU detects, for example, an acceleration in a front-rear direction, a lateral direction, and a vertical direction of vehicle 1 and an angular speed in a roll direction, a pitch direction, and a yaw direction of vehicle 1. The GPS detects a position of vehicle 1 based on information received from a plurality of GPS satellites that orbit the Earth.

Sensor cleaning 115 is configured to remove with a cleaning solution or a wiper, soiling attached to various sensors (a lens of the camera or a portion from which laser beams are emitted) during traveling of vehicle 1.

VCIB 40 includes VCIB 40A (main VCIB) and VCIB 40B (sub VCIB). Each of VCIBs 40A and 40B includes a processor such as a CPU and a memory 41 such as a ROM and a RAM, although none of them is shown. A program executable by the processor is stored in memory 41. Memory 41 of VCIB 40A is also denoted as a memory 41A. Memory 41 of VCIB 40B is also denoted as a memory 41B. VCIB 40A and communication module 111A are communicatively connected to each other through a communication bus 43 (main bus). VCIB 40B and communication module 111B are communicatively connected to each other through a communication bus 44 (sub bus). VCIB 40A and VCIB 40B are communicatively connected to each other.

VCIBs 40A and 40B each relay control requests and vehicle information between ADS 11 and VP 20. VCIB 40A interfaces between base vehicle 30 and ADS 11 through communication bus 43. VCIB 40B interfaces between base vehicle 30 and ADS 11 through communication bus 44. VCIB 40 thus interfaces between base vehicle 30 and ADS 11 through communication bus 43 and communication bus 44. VCIBs 40A and 40B each generate a control command from a control request from ADS 11 with the use of an API.

For example, a control command corresponding to a control request supplied from ADS 11 to VCIB 40 includes a propulsion direction command requesting switching of the shift range, an immobilization command requesting activation/deactivation of EPB system 341 and P-Lock system 342, an acceleration command requesting acceleration or deceleration of vehicle 1, a wheel steer angle command requesting a wheel steer angle of a steering wheel, an autonomization command requesting switching between an autonomous mode and a manual mode, and a standstill command requesting keeping on stationary or keeping off stationary of the vehicle.

Then, VCIBs 40A and 40B each output the generated control command to a corresponding system of a plurality of systems included in VP 20. VCIBs 40A and 40B each generate information indicating a vehicle status from the vehicle information from each system of VP 20 with the use of the API. The information indicating the vehicle status may be information identical to the vehicle information or may be information extracted from the vehicle information to be used for processing performed by ADS 11. VCIBs 40A and 40B each provide the generated information indicating the vehicle status to ADS 11.

Brake system 32 includes brake systems 321 and 322. Steering system 33 includes steering systems 331 and 332. Powertrain system 34 includes a wheel lock control system 340 and propulsion system 343.

Though VCIB 40A and VCIB 40B are basically equivalent in function to each other, they are partially different in systems connected thereto that are included in VP 20. Specifically, VCIB 40A, brake system 321, steering system 331, EPB system 341, P-Lock system 342, propulsion system 343, and body system 36 are communicatively connected to one another through a communication bus. VCIB 40B, brake system 322, steering system 332, and P-Lock system 342 are communicatively connected to one another through a communication bus.

As VCIBs 40A and 40B equivalent in function relating to an operation of at least one of (for example, braking or steering) systems are thus included in VCIB 40, control systems between ADS 11 and VP 20 are redundant. Thus, when some kind of failure occurs in the system, the function of VP 20 can be maintained by switching between the control systems as appropriate or disconnection of a control system where failure has occurred.

Brake systems 321 and 322 are each configured to control a braking apparatus. Brake system 321 generates a braking command to the braking apparatus in accordance with a control request outputted from ADS 11 through VCIB 40A. Brake system 322 generates a braking command to the braking apparatus in accordance with a control request outputted from ADS 11 through VCIB 40B. Brake system 321 and brake system 322 may be equivalent in function to each other. Alternatively, one of brake systems 321 and 322 may be configured to independently control braking force of each wheel and the other thereof may be configured to control braking force such that equal braking force is generated in the wheels. For example, brake systems 321 and 322 may control the braking apparatus based on a braking command generated by any one of them, and when a failure occurs in that brake system, they may control the braking apparatus based on a braking command generated by the other of them.

Steering systems 331 and 332 are each configured to control a steering angle of a steering wheel of vehicle 1 with a steering apparatus. Steering system 331 generates a steering command to the steering apparatus in accordance with a control request outputted from ADS 11 through VCIB 40A. Steering system 332 generates a steering command to the steering apparatus in accordance with a control request outputted from ADS 11 through VCIB 40B. Steering system 331 and steering system 332 may be equivalent in function to each other. Alternatively, steering systems 331 and 332 may control the steering apparatus based on the steering command generated by any one of them, and when a failure occurs in that steering system, they may control the steering apparatus based on a steering command generated by the other of them.

Wheel lock control system 340 is connected to VCIB 40, and includes EPB system 341 and P-Lock system 342.

EPB system 341 controls the EPB in accordance with a control request outputted from ADS 11 through VCIB 40A. The EPB is provided separately from the braking apparatus (a disc brake system or the like), and fixes a wheel by an operation of an actuator. The EPB, for example, activates with an actuator, a drum brake for a parking brake provided in at least one of a plurality of wheels to fix the wheel, or activates a braking apparatus to fix a wheel with an actuator capable of regulating a hydraulic pressure to be supplied to the braking apparatus separately from brake systems 321 and 322. EPB system 341 performs a brakeholding function, and is configured to switch between activation and release of brakehold.

P-Lock system 342 is connected to VCIB 40B. P-Lock system 342 controls a P-Lock apparatus in accordance with a control request outputted from ADS 11 through VCIB 40A. For example, when the control request includes a control request to set the shift range to a parking range (P range), P-Lock system 342 activates the P-Lock apparatus, and when the control request includes a control request to set the shift range to a shift range other than the P range, it deactivates the P-Lock apparatus. The P-Lock apparatus fits a protrusion provided at a tip end of a parking lock pawl, a position of which is adjusted by an actuator, into a tooth of a gear (locking gear) provided as being coupled to a rotational element in the transmission of vehicle 1. Rotation of an output shaft of the transmission is thus fixed and the wheel is fixed.

Propulsion system 343 includes a direction control system 344 and a propulsive system 345. Direction control system 344 is connected to VCIB 40. Direction control system 344 controls a direction of travel (forward travel or rearward travel) of VP 20 by switching the shift range of the shift apparatus in accordance with the control request outputted from ADS 11 through VCIB 40A. The shift ranges include a forward travel range (D range) and a rearward travel range (R range) in addition to the P range and a neutral range (N range). Propulsive system 345 is connected to VCIB 40. Propulsive system 345 controls propulsive force (for example, acceleration and deceleration) of VP 20 by controlling driving force from a drive source (a motor generator and an engine).

Active safety system 35 is communicatively connected to brake system 321. As described previously, active safety system 35 detects an obstacle in front by using camera 54 and/or radar sensor 55, and when it determines that there is possibility of collision, it outputs a braking command to brake system 321 so as to increase braking force.

Body system 36 controls components such as a direction indicator, a horn, or a wiper in accordance with a control request outputted from ADS 11 through VCIB 40A.

For example, when an autonomous mode (autonomous driving mode) is selected by an operation by the user onto HMI 112 in vehicle 1, autonomous driving is carried out. During autonomous driving, ADS 11 initially creates a driving plan as described previously. Examples of the driving plan include a plan to continue straight travel, a plan to turn left/right at a prescribed intersection on a predetermined travel path, and a plan to change a travel lane. ADS 11 calculates a controllable physical quantity (an acceleration, a deceleration, and a wheel steer angle) necessary for operations of vehicle 1 in accordance with the created driving plan. ADS 11 splits the physical quantity for each execution cycle time of the API. ADS 11 outputs a control request representing the split physical quantity to VCIB 40 by means of the API. Furthermore, ADS 11 obtains a vehicle status (an actual direction of movement of vehicle 1 and a state of fixation of the vehicle) from VP 20 and creates again the driving plan on which the obtained vehicle status is reflected. ADS 11 thus allows autonomous driving of vehicle 1.

When there is a failure point in base vehicle 30, ADS 11 preferably determines a failure point and transmits a control request to VP 20. The failure point refers to a location of a failure in the event of occurrence of the failure. If the autonomous driving system is unable to determine the failure point, it may not be able to appropriately transmit the control request to VP 20. For example, in an example where there is a failure point on a communication path to the vehicle-mounted system (for example, wheel lock control system 340, direction control system 344, or propulsive system 345) relating to autonomous driving, a control command based on the control request may disappear on the communication path and may not reach the vehicle-mounted system. Consequently, autonomous driving cannot appropriately be carried out in accordance with the control request from the autonomous driving system. In order to avoid such a situation, on the occurrence of a failure, ADS 11 preferably appropriately determines through which of communication bus 43 and communication bus 44 it should transmit the control request to VP 20, based on the location of the failure point.

VCIB 40 and ADS 11 according to the embodiment are configured to avoid the situation above. Specifically, each of VCIB 40A and VCIB 40B outputs a signal S1 and a signal S2 to ADS 11 based on whether or not there is a failure in VP 20. Compute assembly 111 (specifically, processor 111P) is programmed to receive signal S1 and signal S2 of VCIB 40A through communication module 111A from VCIB 40A and to receive signal S1 and signal S2 of VCIB 40B through communication module 111B from VCIB 40B.

Signal S1 indicates a status (first status) as to whether or not a fault (failure) regarding a functionality in the autonomous mode in VP 20 occurs. Signal S2 indicates a status (second status) of the vehicle-mounted system in accordance with the failure point in VP 20. Signals S1 and S2 of VCIB 40A are also denoted as signals S1A and S2A, respectively. Signals S1 and S2 of VCIB 40B are also denoted as signals S1B and S2B, respectively. The first status varies depending on the location of the failure point and by which of signals S1A and S1B the first status is indicated. The second status varies depending on the location of the failure point and by which of signals S2A and S2B the second status is indicated.

When each of VCIBs 40A and 40B outputs signals S1 and S2, signals S1A and S2A and signals S1B and S2B are inputted to ADS 11. ADS 11 is thus notified of the first status and the second status indicated by respective signals S1A and S2A and the first status and the second status indicated by respective signals S1B and S2B. Consequently, ADS 11 can determine the location of the failure point in accordance with these four statuses. ADS 11 can then appropriately determine through which of communication bus 43 and communication bus 44 it should transmit the control request to VP20 based on the location of the failure point and can thus appropriately transmit the control request to VP 20. Therefore, even when there is a failure point in VP 20, autonomous driving can appropriately be carried out.

In the description below, it is assumed that there is a failure point on a communication path between VCIB 40 and the vehicle-mounted system or in the vehicle-mounted system itself. This vehicle-mounted system is assumed as wheel lock control system 340, direction control system 344, or propulsive system 345 below. This embodiment describes an example where the vehicle-mounted system associated with the failure point is wheel lock control system 340.

Figure 3:
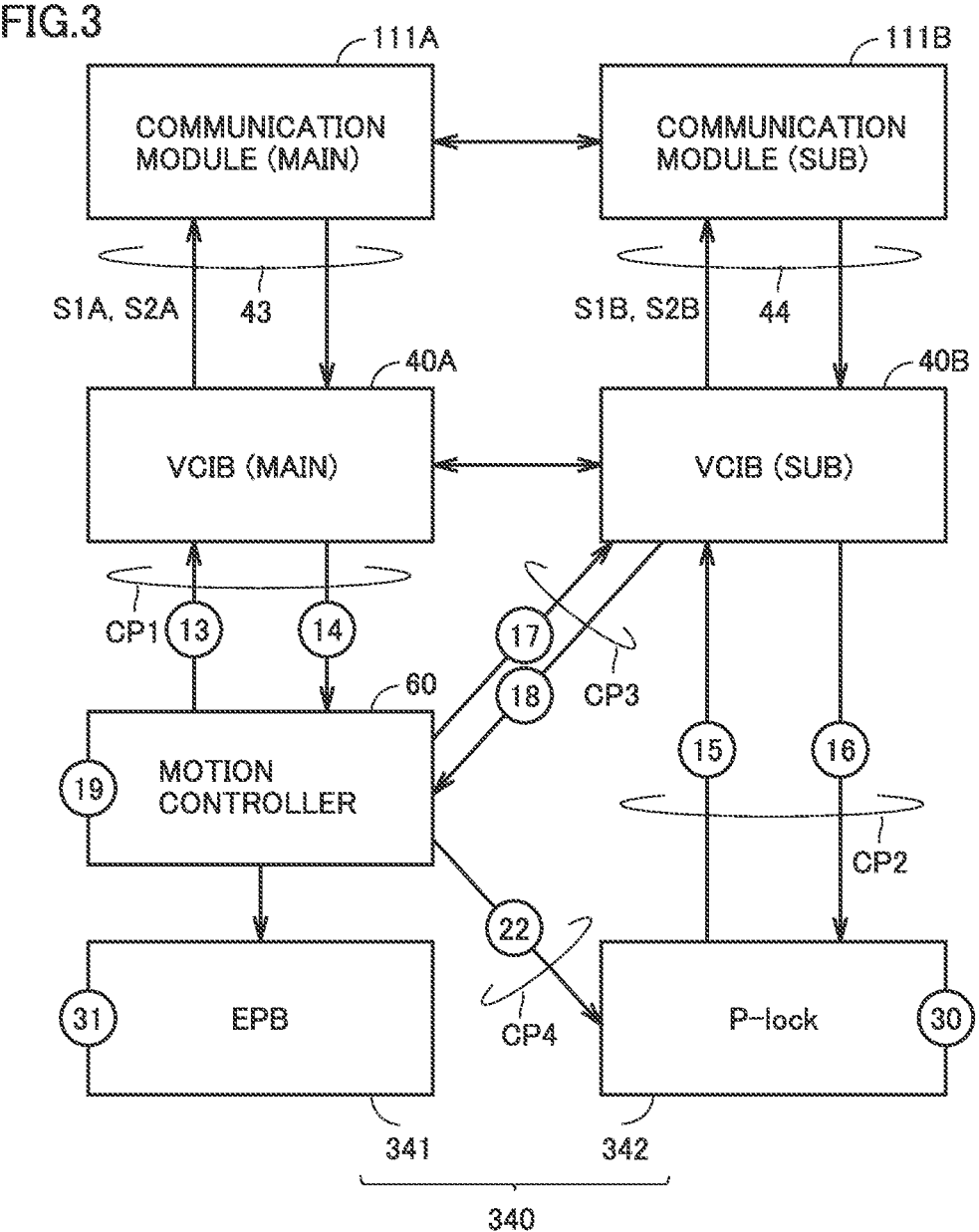
FIG. 3 is a diagram illustrating a flow of a signal in connection with wheel lock control.

FIG. 3 is a diagram illustrating a flow of a signal in connection with wheel lock control. Referring to FIG. 3, a motion controller 60 corresponding to integrated control manager 31 (FIG. 1) controls wheel lock control system 340. Motion controller 60 communicates with each of VCIB 40A, VCIB 40B, EPB system 341, and P-Lock system 342.

VCIB 40A is configured to communicate with each of EPB system 341 and P-Lock system 342 with motion controller 60 being interposed. Similarly, VCIB 40B is configured to communicate with each of EPB system 341 and P-Lock system 342 with motion controller 60 being interposed. VCIB 40A, VCIB 40B, and motion controller 60 are configured to communicate with one another.

In this embodiment, a failure in VP 20 is assumed to occur on a communication path CP1, CP2, CP3, or CP4, or in motion controller 60, EPB system 341, or P-Lock system 342.

Communication path CP1 is formed to establish communication between VCIB 40A and motion controller 60. Communication path CP2 is formed to establish communication between VCIB 40B and P-Lock system 342. Communication path CP3 is formed to establish communication between VCIB 40B and motion controller 60. Communication path CP4 is formed to establish communication between motion controller 60 and P-Lock system 342. Each of communication paths CP1 to CP4 is formed, for example, by CAN communication.

When a failure occurs in a control system (control line) of VCIB 40A, VCIB 40A can determine a location of that failure point. This control system is composed of communication paths CP1 and CP4, motion controller 60, EPB system 341, and P-Lock system 342. A technique for determination of a location of a failure point by VCIB 40A will be exemplified below.

When VCIB 40A does not receive within a prescribed time period, response corresponding to a control command from motion controller 60 after it transmitted the control command to motion controller 60, it determines that communication with motion controller 60 has been disconnected. VCIB 40A thus determines that the failure point is located on communication path CP1 or in motion controller 60. Information indicating the prescribed time period is stored in memory 41A.

When VCIB 40A has established communication with motion controller 60, it determines that the failure point is located on communication path CP4 or in P-Lock system 342 based on a first failure signal from motion controller 60. The first failure signal indicates that the failure point is located on communication path CP4 or in P-Lock system 342. When motion controller 60 does not receive within a prescribed time period, response corresponding to a control command from P-Lock system 342 after it transmitted the control command to P-Lock system 342, it determines that communication with P-Lock system 342 has been disconnected. VCIB 40B thus determines that the failure point is located on communication path CP4 or in P-Lock system 342 and transmits the first failure signal to VCIB 40A.

When VCIB 40A has established communication with motion controller 60, it determines that the failure point is located in EPB system 341 based on a second failure signal from motion controller 60. The second failure signal indicates that the failure point is located in EPB system 341. When motion controller 60 does not receive within a prescribed time period, response corresponding to a control command from EPB system 341 after it transmitted the control command to EPB system 341, it determines that communication with EPB system 341 has been disconnected. VCIB 40B thus determines that the failure point is located in EPB system 341 and transmits the second failure signal to VCIB 40A.

VCIB 40A determines whether or not there is a failure point in accordance with a status (established/disconnected) of communication with motion controller 60 and presence or absence of the first failure signal and the second failure signal. For example, when VCIB 40A has established communication with motion controller 60 and when it receives neither of the first failure signal and the second failure signal, it determines that there is no failure point in VP 20 (specifically, the control system of VCIB 40A). When communication of VCIB 40A with motion controller 60 has been disconnected or when VCIB 40A receives at least one of the first failure signal and the second failure signal, VCIB 40A determines that there is a failure point.

When a failure occurs in the control system (control line) of VCIB 40B, VCIB 40B can determine a location of that failure point. This control system is composed of communication paths CP2, CP3, and CP4, motion controller 60, EPB system 341, and P-Lock system 342. A technique for determination of a location of a failure point by VCIB 40B will be exemplified below.

When VCIB 40B does not receive within a prescribed time period, response corresponding to a control command from P-Lock system 342 after it transmitted the control command to P-Lock system 342, it determines that communication with P-Lock system 342 has been disconnected. VCIB 40B thus determines that the failure point is located on communication path CP2 or in P-Lock system 342. Information indicating the prescribed time period is stored in memory 41B.

When VCIB 40B does not receive within a prescribed time period, response corresponding to a control command from motion controller 60 after it transmitted the control command to motion controller 60, it determines that communication with motion controller 60 has been disconnected. VCIB 40B thus determines that the failure point is located on communication path CP3 or in motion controller 60.

When VCIB 40B has established communication with motion controller 60, it determines that the failure point is located in EPB system 341 based on a third failure signal from motion controller 60. The third failure signal indicates that the failure point is located in EPB system 341. When motion controller 60 does not receive within a prescribed time period, response corresponding to a control command from EPB system 341 after it transmitted the control command to EPB system 341, it determines that communication with EPB system 341 has been disconnected. Motion controller 60 thus determines that the failure point is located in EPB system 341 and transmits the third failure signal to VCIB 40B.

VCIB 40B determines whether or not there is a failure point in accordance with a status (established/disconnected) of communication with motion controller 60 or P-Lock system 342 and presence or absence of the third failure signal. For example, when VCIB 40B has established communication with motion controller 60 and P-Lock system 342 and when it does not receive the third failure signal, it determines that there is no failure point in VP 20 (specifically, the control system of VCIB 40B). When communication of VCIB 40B with motion controller 60 or P-Lock system 342 has been disconnected or when VCIB 40B receives the third failure signal, VCIB 40B determines that there is a failure point.

FIG. 4 is a diagram schematically showing data stored in memory 41A of VCIB 40A in the embodiment. Referring to FIG. 4, data 410 is used by VCIB 40A for setting a value V1 of signal S1 and a value V2 of signal S2 in accordance with a location of the failure point.

The "failure point" corresponds to a number and a reference numeral in a circle in FIG. 3.

"VP_Autonomy_Fault" corresponds to value V1 of signal S1 and represents a status as to whether or not a fault regarding a functionality in the autonomous mode in VP 20 occurs in the control system of VCIB 40. For example, "VP_Autonomy_Fault" (value V1) set to 0 indicates absence of the failure. "VP_Autonomy_Fault" set to 1 indicates presence of the failure.

In this example, "VP_Autonomy_Fault" corresponds to a value V1A of signal S1 (S1A). Value V1A set to 0 and value V1A set to 1 indicate absence and presence of the failure in the control system of VCIB 40A, respectively.

"WheelLock_Control_Degradation_Modes" corresponds to value V2 of signal S2 and represents a status of wheel lock control system 340 in accordance with the failure point in VP 20. As will be described below, this status includes loss of the function of wheel lock control system 340, a degraded operation of EPB system 341, and a degraded operation of P-Lock system 342.

For example, "WheelLock_Control_Degradation_Modes" (value V2) set to 0 indicates that the status of wheel lock control system 340 is normal (Normal). "WheelLock_Control_Degradation_Modes" set to 1 indicates that the status of wheel lock control system 340 is loss of the function (LOSS_OF_FUNCTION). In the case of the loss of the function, wheel lock control system 340 may not operate. "WheelLock_Control_Degradation_Modes" set to 2 indicates that the status of wheel lock control system 340 is the degraded operation of EPB system 341. In this degraded operation, EPB system 341 may not be activated. "WheelLock_Control_Degradation_Modes" set to 3 indicates that the status of wheel lock control system 340 is the degraded operation of P-Lock system 342. In this degraded operation, P-Lock system 342 may not be activated.

In this example, "WheelLock_Control_Degradation_Modes" corresponds to a value V2A of signal S2A. When the failure point is located on communication path CP1 or in motion controller 60, the status of wheel lock control system 340 indicated by signal S2A (value V2A) is the loss of the function (V2A=1). When the failure point is located on communication path CP4 or in P-Lock system 342, the status of wheel lock control system 340 is the degraded operation of P-Lock system 342 (V2A=3). When the failure point is located in EPB system 341, the status of wheel lock control system 340 is the degraded operation of EPB system 341 (V2A=2).

VCIB 40A sets values V1A and V2A in accordance with data 410 and the location of the failure point. For example, when the failure point is located on communication path CP1, VCIB 40A sets both of values V1A and V2A to 1. When VCIB 40A determines that there is no failure point, on the other hand, it sets both of values V1A and V2A to 0 (not shown).

FIG. 5 is a diagram schematically showing data stored in memory 41B of VCIB 40B in the embodiment. Referring to FIG. 5, data 420 is used by VCIB 40B to set value V1 of signal S1 and value V2 of signal S2 in accordance with a location of the failure point.

In this example, "VP_Autonomy_Fault" corresponds to a value V1B of signal S1B. Value V1B set to 0 and value V1B set to 1 indicate absence and presence of a failure in the control system of VCIB 40B, respectively.

Similarly, "WheelLock_Control_Degradation_Modes" corresponds to a value V2B of signal S2B. When the failure point is located in motion controller 60, on communication path CP3, or in EPB system 341, the status of wheel lock control system 340 indicated by signal S2B (value V2B) is the degraded operation of EPB system 341 (V2B=2). When the failure point is located in P-Lock system 342 or on communication path CP2, the status of wheel lock control system 340 is the degraded operation of P-Lock system 342 (V2B=3).

VCIB 40B sets values V1B and V2B in accordance with data 420 and the location of the failure point. For example, when the failure point is located in motion controller 60, VCIB 40B sets value V1B to 1 and sets value V2B to 2. When VCIB 40B determines that there is no failure point, on the other hand, it sets both of values V1B and V2B to 0 (not shown).

FIG. 6 is a diagram schematically showing data stored in memory 111M of ADS 11 in the embodiment. Referring to FIG. 6, data 430 represents relation between combination of values V1A, V2A, V1B, and V2B and the location of the failure point. Data 430 is based on data 410 and data 420 (FIGS. 4 and 5).

ADS 11 determines whether or not there is a failure point in VP 20 and determines the failure point when there is a failure point, in accordance with values V1A, V2A, V1B, and V2B and data 430. For example, when the combination of values V1A, V2A, V1B, and V2B is different from the combination in FIG. 6 (when it is 0, 0, 0, and 0 by way of example), ADS 11 determines that there is no failure.

When the combination of values V1A, V2A, V1B, and V2B is the same as the combination in FIG. 6, on the other hand, ADS 11 determines that there is a failure. For example, when values V1A, V2A, V1B, and V2B are 1, 1, 0, and 0, respectively, ADS 11 determines that the failure point is located on communication path CP1. In this case, if ADS 11 transmits a control request to VP 20 through communication bus 43, the control command based on the control request may disappear on communication path CP1 and may not reach wheel lock control system 340. In this example, on the occurrence of the failure on communication path CP1, ADS 11 determines to transmit the control request to VP 20 through communication bus 44 (selects communication bus 44 as the communication bus to be used for transmission of the control request). The control command based on the control request can thus reach wheel lock control system 340 through VCIB 40B and communication path CP2 or CP3. On the occurrence of the failure in VP 20, ADS 11 can thus appropriately determine through which of communication bus 43 and communication bus 44 it should transmit the control command to VP 20, based on the location of the failure point.

Figure 7:
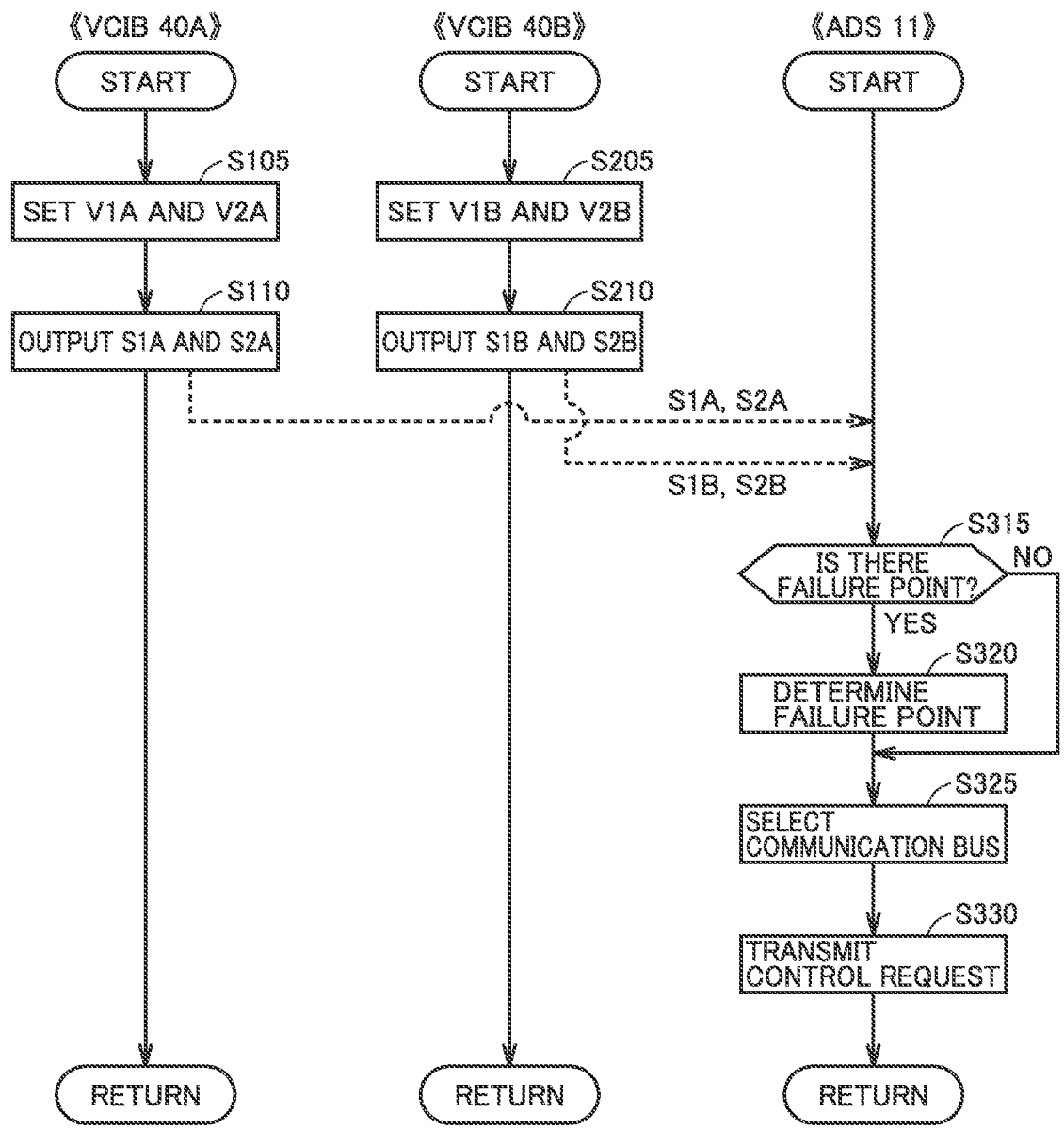
FIG. 7 is a flowchart exemplifying a procedure of processing performed in connection with determination of a failure point in the embodiment.

FIG. 7 is a flowchart exemplifying a procedure of processing performed in connection with determination of a failure point in the embodiment. This flowchart is performed every prescribed time period. A step is abbreviated as "S" below.

Referring to FIG. 7, VCIB 40A sets values V1A and V2A in accordance with whether or not there is a failure point in the control system thereof and data 410 (S105) and thus outputs signals S1A and S2A to ADS 11 (S110). Similarly, VCIB 40B sets values V1B and V2B in accordance with whether or not there is a failure point in the control system thereof and data 420 (S205) and thus outputs signals S1B and S2B to ADS 11 (S210).

ADS 11 determines the combination of values V1A, V2A, V1B, and V2B based on signals S1A, S2A, S1B, and S2B and determines whether or not there is a failure point in VP 20 in accordance with a result of this determination (S315). When there is no failure point (NO in S315), for example, when all of values V1A, V2A, V1B, and V2B are 0, the process proceeds to S325.

When there is a failure point (YES in S315), ADS 11 determines the failure point in accordance with the combination of values V1A, V2A, V1B, and V2B and data 430 (S320). ADS 11 selects a communication bus (communication bus 43 or communication bus 44) to be used for transmission of the control request, based on a result of this determination (S325). For example, when the failure point is located on communication path CP1, ADS 11 selects communication bus 44. When there is no failure point (NO in S315), ADS 11 may select communication bus 43 or communication bus 44 based on the vehicle status. After S325, ADS 11 transmits the control request to VP 20 through the selected communication bus (S330).

As set forth above, according to the embodiment, even when there is a failure point in VP 20, autonomous driving can appropriately be carried out.

First Modification

An example in which the vehicle-mounted system associated with the failure point is direction control system 344 will be described in a first modification. An overall configuration and a procedure of processing in the first modification are basically similar to those in the embodiment.

Figures 8, 9:
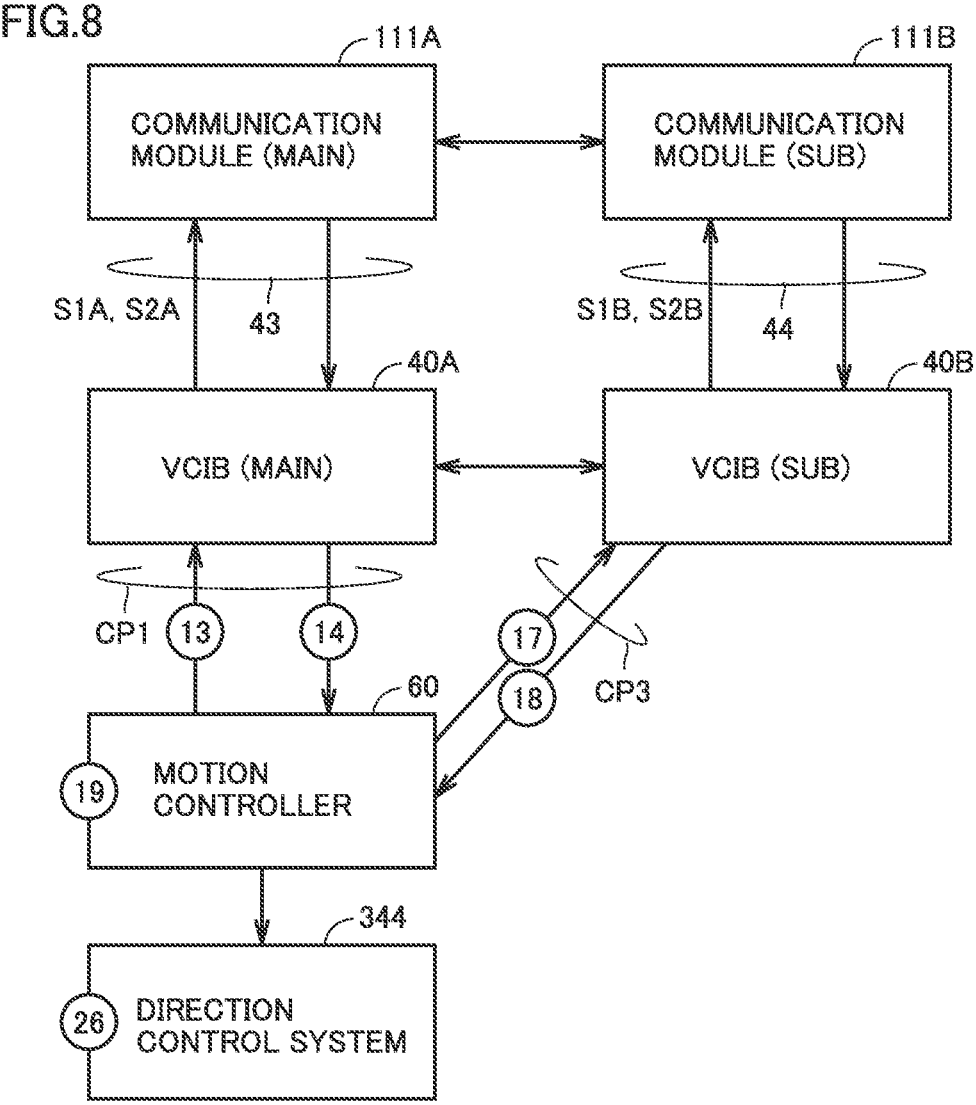
FIG. 8 is a diagram illustrating a flow of a signal in connection with vehicle direction control.
FIGS. 9 and 10 are each a diagram schematically showing data stored in the memory of the VCIB in a first modification.

FIG. 8 is a diagram illustrating a flow of a signal in connection with vehicle direction control. Referring to FIG. 8, it is assumed that a failure in VP 20 occurs on communication path CP1 or CP3 or in motion controller 60 or direction control system 344.

The control system of VCIB 40A is composed of communication path CP1, motion controller 60, and direction control system 344. A technique for determination by VCIB 40A that the failure point is located on communication path CP1 or in motion controller 60 is the same as in the embodiment. When VCIB 40A has established communication with motion controller 60, it determines that the failure point is located in direction control system 344 based on a fourth failure signal from motion controller 60. The fourth failure signal indicates that the failure point is located in direction control system 344. VCIB 40A determines whether or not there is a failure point in accordance with a status (established/disconnected) of communication with motion controller 60 and presence or absence of the fourth failure signal.

The control system of VCIB 40B is composed of communication path CP3, motion controller 60, and direction control system 344. A technique for determination by VCIB 40B that the failure point is located on communication path CP3 or in motion controller 60 is the same as in the embodiment. When VCIB 40B has established communication with motion controller 60, it determines that the failure point is located in direction control system 344 based on a fifth failure signal from motion controller 60. The fifth failure signal indicates that the failure point is located in direction control system 344. VCIB 40B determines whether or not there is a failure point in accordance with a status (established/disconnected) of communication with motion controller 60 and presence or absence of the fifth failure signal.

FIG. 9 is a diagram schematically showing data stored in memory 41A of VCIB 40A in the first modification. Referring to FIG. 9, data 510 is used by VCIB 40A to set value V1 of signal S1 and value V2 of signal S2 in accordance with a location of the failure point.

"Direction_Control_Degradation_Modes" corresponds to value V2 of signal S2 and indicates a status of direction control system 344 in accordance with the failure point in VP 20. "Direction_Control_Degradation_Modes" (value V2) set to 0 indicates that the status of direction control system 344 is normal. "Direction_Control_Degradation_Modes" set to 1 indicates that the status of direction control system 344 is loss of the function (LOSS_OF_FUNCTION). In the case of the loss of the function, direction control system 344 may not operate.

VCIB 40A sets values V1A and V2A in accordance with data 510 and the location of the failure point. For example, when the failure point is located in direction control system 344, VCIB 40A sets both of values V1A and V2A to 1.

Figure 10:
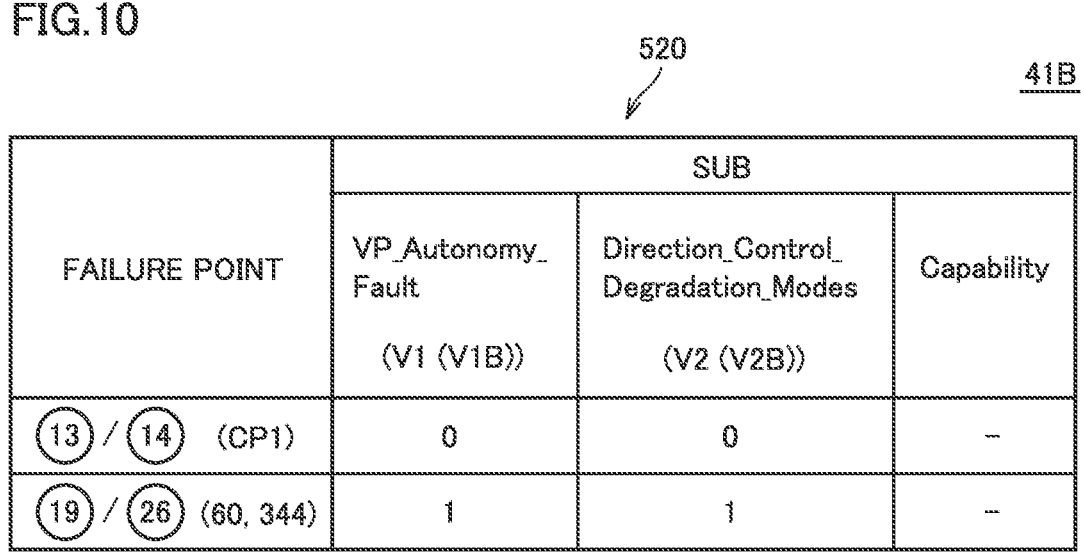

FIG. 10 is a diagram schematically showing data stored in memory 41B of VCIB 40B in the first modification. Referring to FIG. 10, data 520 is used by VCIB 40B to set value V1 of signal S1 and value V2 of signal S2 in accordance with a location of the failure point.

VCIB 40B sets values V1B and V2B in accordance with data 520 and the location of the failure point. For example, when the failure point is located in direction control system 344, VCIB 40B sets both of values V1B and V2B to 1.

FIG. 11 is a diagram schematically showing data stored in memory 111M of ADS 11 in the first modification. Referring to FIG. 11, data 530 represents relation between the combination of values V1A, V2A, V1B, and V2B and the location of the failure point. Data 530 is based on data 510 and data 520 (FIGS. 9 and 10). ADS 11 determines whether or not there is a failure point in VP 20 and determines the failure point when there is a failure point, in accordance with values V1A, V2A, V1B, and V2B and data 530. For example, when values V1A, V2A, V1B, and V2B are set to 1, 1, 0, and 0, respectively, ADS 11 determines that the failure point is located on communication path CP1.

Second Modification

An example in which the vehicle-mounted system associated with the failure point is propulsive system 345 will be described in a second modification. An overall configuration and a procedure of processing in the second modification are basically similar to those in the embodiment.

Figures 12, 13:
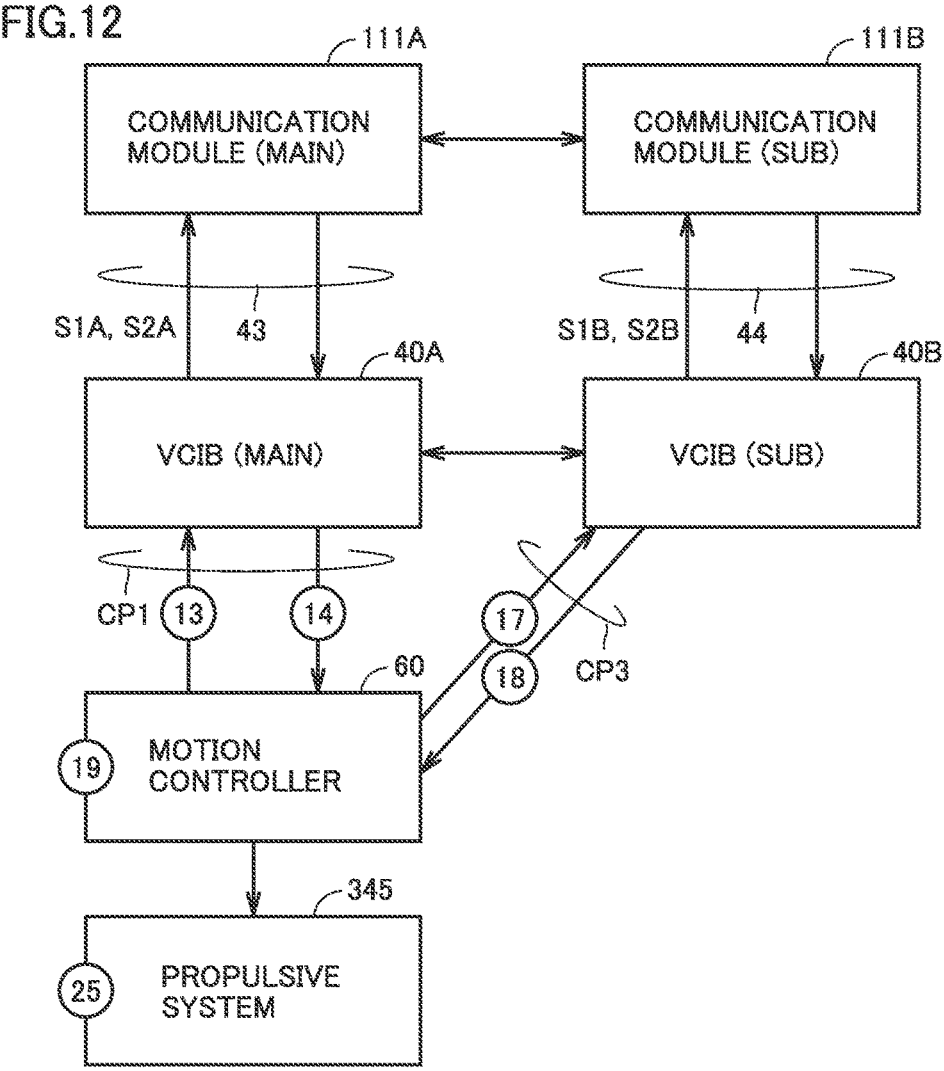
FIG. 12 is a diagram illustrating a flow of a signal in connection with propulsive force control.
FIGS. 13 and 14 are each a diagram schematically showing data stored in the memory of the VCIB in a second modification.

FIG. 12 is a diagram illustrating a flow of a signal in connection with propulsive force control. Referring to FIG. 12, it is assumed that a failure in VP 20 occurs on communication path CP1 or CP3 or in motion controller 60 or propulsive system 345.

The control system of VCIB 40A is composed of communication path CP1, motion controller 60, and propulsive system 345. A technique for determination by VCIB 40A that the failure point is located on communication path CP1 or in motion controller 60 is the same as in the embodiment. When VCIB 40A has established communication with motion controller 60, it determines that the failure point is located in propulsive system 345 based on a sixth failure signal from motion controller 60. The sixth failure signal indicates that the failure point is located in propulsive system 345. VCIB 40A determines whether or not there is a failure point in accordance with a status (established/disconnected) of communication with motion controller 60 and presence or absence of the sixth failure signal.

The control system of VCIB 40B is composed of communication path CP3, motion controller 60, and propulsive system 345. A technique for determination by VCIB 40B that the failure point is located on communication path CP3 or in motion controller 60 is the same as in the embodiment. When VCIB 40B has established communication with motion controller 60, it determines that the failure point is located in propulsive system 345 based on a seventh failure signal from motion controller 60. The seventh failure signal indicates that the failure point is located in propulsive system 345. VCIB 40B determines whether or not there is a failure point in accordance with a status (established/disconnected) of communication with motion controller 60 and presence or absence of the seventh failure signal.

FIG. 13 is a diagram schematically showing data stored in memory 41A of VCIB 40A in the second modification. Referring to FIG. 13, data 610 is used by VCIB 40A to set value V1 of signal S1 and value V2 of signal S2 in accordance with a location of the failure point.

"Propulsive_System_Degradation_Modes" corresponds to value V2 of signal S2 and indicates the status of propulsive system 345 in accordance with the failure point in VP 20. "Propulsive_System_Degradation_Modes" (value V2) set to 0 indicates that the status of propulsive system 345 is normal. "Propulsive_System_Degradation_Modes" set to 1 indicates that the status of propulsive system 345 is loss of the function (LOSS_OF_FUNCTION). In the case of the loss of the function, propulsive system 345 may not operate.

VCIB 40A sets values V1A and V2A in accordance with data 610 and the location of the failure point. For example, when the failure point is located in propulsive system 345, VCIB 40A sets both of values V1A and V2A to 1.

Figure 14:

FIG. 14 is a diagram schematically showing data stored in memory 41B of VCIB 40B in the second modification. Referring to FIG. 14, data 620 is used by VCIB 40B to set value V1 of signal S1 and value V2 of signal S2 in accordance with a location of the failure point.

VCIB 40B sets values V1B and V2B in accordance with data 620 and the location of the failure point. For example, when the failure point is located in propulsive system 345, VCIB 40B sets both of values V1B and V2B to 1.

FIG. 15 is a diagram schematically showing data stored in memory 111M of ADS 11 in the second modification. Referring to FIG. 15, data 630 represents relation between the combination of values V1A, V2A, V1B, and V2B and the location of the failure point. Data 530 is based on data 610 and data 620 (FIGS. 13 and 14). ADS 11 determines whether or not there is a failure point in VP 20 and determines the failure point when there is a failure point, in accordance with values V1A, V2A, V1B, and V2B and data 630. For example, when values V1A, V2A, V1B, and V2B are set to 0, 0, 1, and 1, respectively, ADS 11 determines that the failure point is located on communication path CP3.

It should be understood that the embodiment disclosed herein is illustrative and non-restrictive in every respect. The scope of the present disclosure is defined by the terms of the claims rather than the description above and is intended to include any modifications within the scope and meaning equivalent to the terms of the claims.

EXAMPLE

API Specification for TOYOTA Vehicle Platform
Ver. 1.1
Records of Revision

| Date of Revision | ver. | Overview of Revision | Reviser |
|---|---|---|---|
| 2020 May 23 | 1.0 | Creating a new material | TOYOTA MOTOR Corp. |
| 2021 Apr. 14 | 1.1 | The figure of Front Wheel Steer Angle Rate Limitation is updated. Explanation of Standstill Status is added. | TOYOTA MOTOR Corp. |

| TABLE of Contents |
|---|

1. Introduction
   1.1. Purpose of this Specification
   1.2. Target Vehicle
   1.3. Definition of Term
2. Structure
   2.1. Overall Structure of Autono-MaaS Vehicle
   2.2. System Structure of Autono-MaaS Vehicle
3. Application Interfaces
   3.1. Typical Usage of APIs -continued TABLE of Contents 3.2. APIs for Vehicle Motion Control
   3.2.1. API List for Vehicle Motion Control
   3.2.2. Details of Each API for Vehicle Motion Control
3.3. APIs for BODY Control
   3.3.1. API List for BODY Control
   3.3.2. Details of Each API for BODY Control
3.4. APIs for Power Control
   3.4.1. API List for Power Control
   3.4.2. Details of Each API for Power Control
3.5. APIs for Failure Notification
   3.5.1. API List for Failure Notification
   3.5.2. Details of Each API for Failure Notification
3.6. APIs for Security
   3.6.1. API List for Security
   3.6.2. Details of Each API for Security
4. API Guides to Control Toyota Vehicles
  4.1. APIs for Vehicle Motion Control
   4.1.1. API List for Vehicle Motion Control
   4.1.2. API Guides in Details for Vehicle Motion Control
  4.2. APIs for BODY Control
   4.2.1. API List for BODY Control
  4.3. APIs for Power Control
   4.3.1. API List for Power Control
  4.4. APIs for Failure Notification
   4.4.1. API List for Failure Notification
  4.5. APIs for Security
   4.5.1. API List for Security
   4.5.2. API Guides in Details for Security 1. Introduction 1.1. Purpose of this Specification This document is an API specification of vehicle control interface for Autono-MaaS vehicles and contains outline, the way to use and note of APIs.

1.2. Target Vehicle

This specification is applied to the Autono-MaaS vehicles defined by [Architecture Specification for TOYOTA Vehicle Platform attached with Automated Driving System].

1.3. Definition of Term

TABLE 1

Definition of Term

| Term | Definition |
|---|---|
| ADS | Autonomous Driving System |
| ADK | Autonomous Driving Kit |
| VP | Vehicle Platform |

TABLE 1-continued

Definition of Term

| Term | Definition |
|---|---|
| VCIB | Vehicle Control Interface Box. This is an ECU for the interface and the signal converter between ADS and VP's sub systems. |
| PCS | Pre-Collision Safety |

2. Structure 2.1. Overall Structure of Autono-MaaS Vehicle

Figure 16:
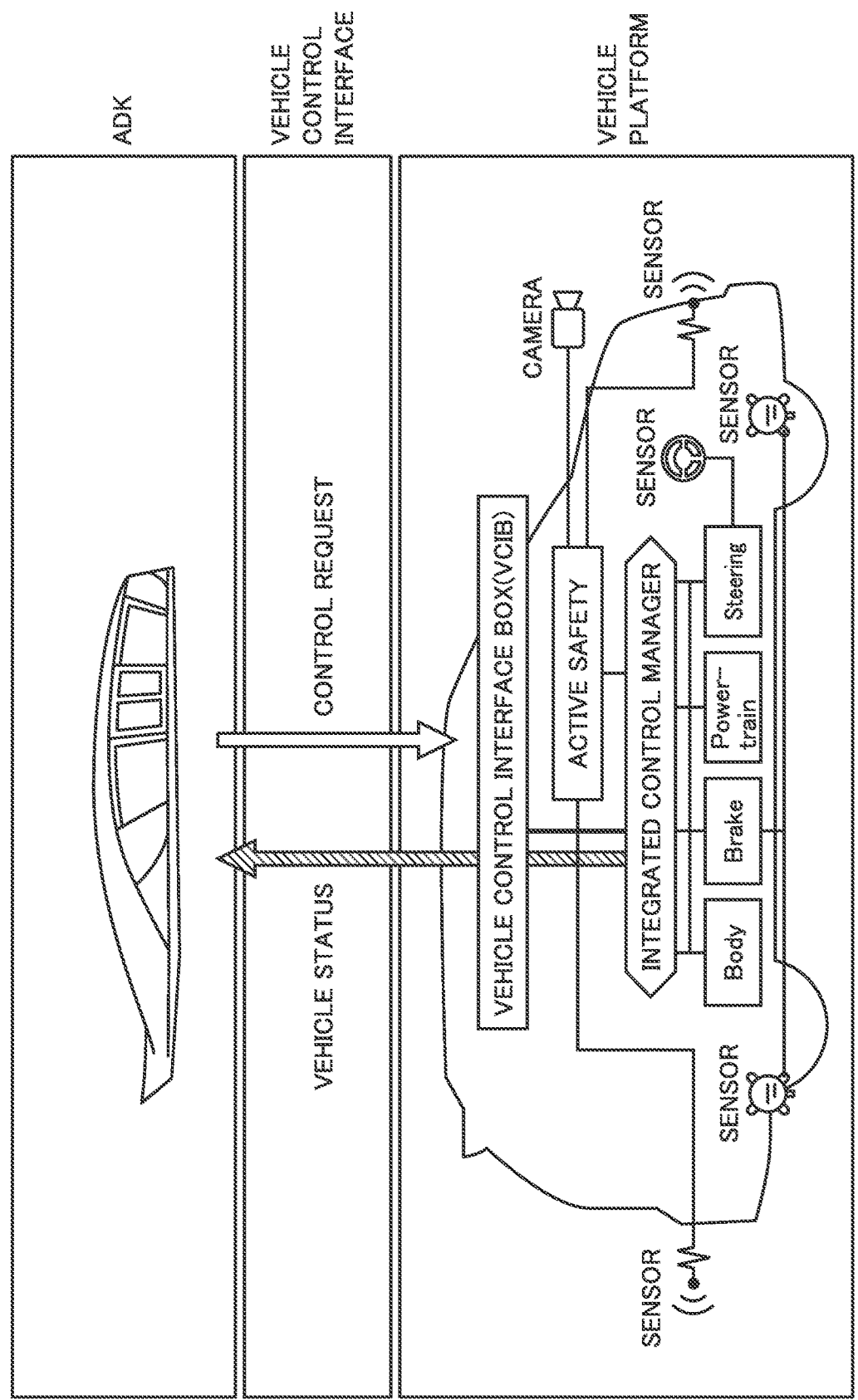
FIG. 16 is a diagram showing an overall structure of an Autono-MaaS vehicle.

The overall structure of Autono-MaaS is shown (FIG. 16).

2.2. System Structure of Autono-MaaS Vehicle

Figure 17:
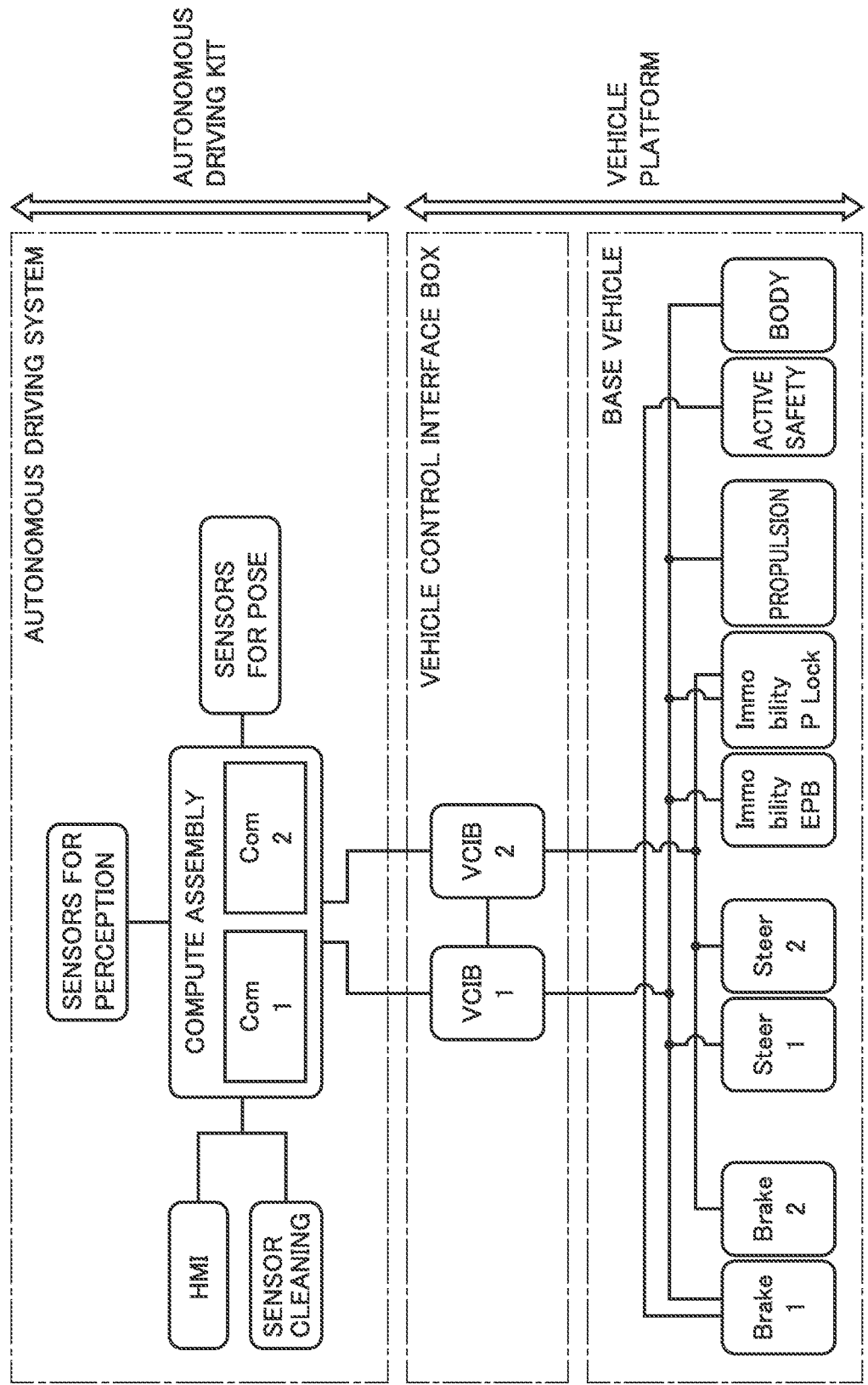
FIG. 17 is a diagram showing a system architecture of the Autono-MaaS vehicle.

System Architecture is shown in FIG. 17.

3. Application Interfaces 3.1. Typical Usage of APIs

In this section, Typical Usage of APIs is described.

A typical workflow of APIs is as follows (FIG. 18). The following example assumes CAN for physical communication.

3.2. APIs for Vehicle Motion Control

In this section, the APIs for vehicle motion control are described.

3.2.1. API List for Vehicle Motion Control 3.2.1.1. Inputs

TABLE 3

Input APIs for vehicle motion control

| Signal Name | Description | Redundancy |
|---|---|---|
| Propulsion Direction Command | Request for shift change from/to forward (D range) to/from back (R range) | N/A |
| Immobilization Command | Request for turning on/off WheelLock | Applied |
| Standstill Command | Request for keeping on/off stationary | Applied |
| Acceleration Command | Request for acceleration/deceleration | Applied |
| Front Wheel Steer Angle Command | Request for front wheel steer angle | Applied |
| Vehicle Mode Command | Request for changing from/to manual mode to/from Autonomous Mode | Applied |
| High Dynamics Command | Request for increasing braking response performance* | Applied |

*Reaction time in VP upon a request from ADK 3.2.1.2. Outputs

TABLE 4

Output APIs for vehicle motion control

| Signal Name | Description | Redundancy |
|---|---|---|
| Propulsion Direction Status | Current shift status | N/A |
| Immobilization Status | Status of immobilization (i.e. EPB and Shift P) | Applied |
| Standstill Status | Standstill status | N/A |
| Estimated Gliding Acceleration | Estimated vehicle acceleration/deceleration when throttle is fully closed | N/A |
| Estimated maximum acceleration | Estimated maximum acceleration | Applied |
| Estimated maximum deceleration | Estimated maximum deceleration | Applied |
| Front wheel steer angle | Front wheel steer angle | Applied |
| Front wheel steer angle rate | Front wheel steer angle rate | Applied |
| Front wheel steer angle rate limitation | Road wheel angle rate limit | Applied |
| Estimated maximum lateral acceleration | Estimated max lateral acceleration | Applied |
| Estimated maximum lateral acceleration rate | Estimated max lateral acceleration rate | Applied |

TABLE 4-continued

Output APIs for vehicle motion control

| Signal Name | Description | Redundancy |
|---|---|---|
| Intervention of accelerator pedal | This signal shows whether the accelerator pedal is depressed by a driver (intervention) | N/A |
| Intervention of brake pedal | This signal shows whether the brake pedal is depressed by a driver (intervention) | N/A |
| Intervention of steering wheel | This signal shows whether the steering wheel is turned by a driver (intervention) | N/A |
| Intervention of shift lever | This signal shows whether the shift lever is controlled by a driver (intervention) | N/A |
| Wheel speed pulse (front left) | Pulse from wheel speed sensor (Front Left Wheel) | N/A |
| Wheel rotation direction (front left) | Rotation direction of wheel (Front Left) | N/A |
| Wheel speed pulse (front right) | Pulse from wheel speed sensor (Front Right Wheel) | N/A |
| Wheel rotation direction (front right) | Rotation direction of wheel (Front Right) | N/A |
| Wheel speed pulse (rear left) | Pulse from wheel speed sensor (Rear Left Wheel) | Applied |
| Wheel rotation direction (Rear left) | Rotation direction of wheel (Rear Left) | Applied |
| Wheel speed pulse (rear right) | Pulse from wheel speed sensor (Rear Right Wheel) | Applied |
| Wheel rotation direction (Rear right) | Rotation direction of wheel (Rear Right) | Applied |
| Traveling direction | Moving direction of vehicle | Applied |
| Vehicle velocity | Estimated longitudinal velocity of vehicle | Applied |
| Longitudinal acceleration | Estimated longitudinal acceleration of vehicle | Applied |
| Lateral acceleration | Sensor value of lateral acceleration of vehicle | Applied |
| Yawrate | Sensor value of yaw rate | Applied |
| Slipping Detection | Detection of tire glide/spin/skid | Applied |
| Vehicle mode state | State of whether Autonomous Mode, manual mode | Applied |
| Readiness for autonomization | Situation of whether the vehicle can transition to Autonomous Mode or not | Applied |
| Failure status of VP functions for Autonomous Mode | This signal is used to show whether VP functions have some failures mode when a vehicle works as Autonomous Mode. | Applied |
| PCS Alert Status | Status of PCS (Alert) | N/A |
| PCS Preparation Status | Status of PCS (Prefill) | N/A |
| PCS Brake/PCS Brake Hold Status | Status of PCS (PB/PBH) | N/A |
| ADS/PCS arbitration status | ADS/PCS arbitration status | N/A |

3.2.2. Details of Each API for Vehicle Motion Control
3.2.2.1. Propulsion Direction Command
Request for shift change from/to forward (D range) to/from back (R range)

| Value | Description | Remarks |
|---|---|---|
| 0 | No Request | |
| 2 | R | Shift to R range |
| 4 | D | Shift to D range |
| other | Reserved | |

Remarks
  Available only when Vehicle mode state="Autonomous Mode."
  Available only when a vehicle is stationary (Traveling direction="standstill").
  Available only when brake is applied.

3.2.2.2. Immobilization Command
Request for turning on/off WheelLock
Values
  The following table shows a case where EPB and Shift P are used for immobilization.

| Value | Description | Remarks |
|---|---|---|
| 0 | No Request | |
| 1 | Applied | EPB is turned on and shift position is changed to "P" |
| 2 | Released | EPB is turned off and shift position is changed to the value of Propulsion Direction Command |

Remarks
  This API is used for parking a vehicle.
  Available only when Vehicle mode state="Autonomous Mode."
  Changeable only when the vehicle is stationary (Traveling direction="standstill").
  Changeable only while brake is applied.

3.2.2.3. Standstill Command
Request for applying/releasing brake holding function

| | Values | |
|---|---|---|
| Value | Description | Remarks |
| 0 | No Request | |
| 1 | Applied | Brake holding function is allowed. |
| 2 | Released | |

Remarks
  This API is used for choosing a status of whether the brake holding function is allowed.
  Available only when Vehicle mode state="Autonomous Mode."
  Acceleration Command (deceleration request) has to be continued until Standstill Status becomes "Applied".

3.2.2.4. Acceleration Command
Request for Acceleration
Values
  Estimated maximum deceleration to Estimated maximum acceleration [m/s$^2$]
Remarks
  Available only when Vehicle mode state="Autonomous Mode."
  Acceleration (+) and deceleration (−) request based on Propulsion Direction Status direction.

The upper/lower limit will vary based on Estimated maximum deceleration and Estimated maximum acceleration.

When acceleration more than Estimated maximum acceleration is requested, the request is set to Estimated maximum acceleration.

When deceleration more than Estimated maximum deceleration is requested, the request is set to Estimated maximum deceleration.

In case where a driver operates a vehicle (over-ride), the requested acceleration may not be achieved.

When PCS simultaneously works, VP should choose minimum acceleration (maximum deceleration).

3.2.2.5. Front Wheel Steer Angle Command

| Values | | |
|---|---|---|
| Value | Description | Remarks |
| — | [unit: rad] | |

Remarks

Available only when Vehicle mode state="Autonomous Mode"

Left is positive value (+). Right is negative value (−).

Front wheel steer angle is set to value (0) when the vehicle is going straight.

This request is set as a relative value from the current one to prevent misalignment of "Front Wheel Steer Angle" from being accumulated.

The request value should be set within Front wheel steer angle rate limitation.

In case where a driver operates a vehicle (over-ride), the requested Front Wheel Steer Angle may not be achieved.

3.2.2.6. Vehicle Mode Command

Request for changing from/to manual mode to/from Autonomous Mode

| Values | | |
|---|---|---|
| Value | Description | Remarks |
| 0 | No Request | |
| 1 | Request For Autonomy | |
| 2 | Deactivation Request | means transition request to manual mode |

Remarks

N/A 3.2.2.7. High Dynamics Command

If ADK would like to increase braking response performance* of VP, High Dynamics Command should be set to "High".

*Reaction time in VP upon a request from ADK

| Values | | |
|---|---|---|
| Value | Description | Remarks |
| 0 | No Request | |
| 1 | High | |
| 2-3 | Reserved | |

Remarks

N/A 3.2.2.8. Propulsion Direction Status

Current shift Status

| Values | | |
|---|---|---|
| Value | Description | Remarks |
| 0 | Reserved | |
| 1 | P | |
| 2 | R | |
| 3 | N | |
| 4 | D | |
| 5 | Reserved | |
| 6 | Invalid value | |

Remarks

If VP does not know the current shift status, this output is set to "Invalid Value."

3.2.2.9. Immobilization Status

Each Immobilization System Status

Values

The following table shows a case where EPB and Shift P are used for immobilization.

| Value | | Description | Remarks |
|---|---|---|---|
| Shift | EPB | | |
| 0 | 0 | Shift set to other than P, and EPB Released | |
| 1 | 0 | Shift set to P and EPB Released | |
| 0 | 1 | Shift set to other than P, and EPB applied | |
| 1 | 1 | Shift set to P and EPB Applied | |

Remarks

N/A 3.2.2.10. Standstill Status

Status of Standstill

| Values | | |
|---|---|---|
| Value | Description | Remarks |
| 0 | Released | |
| 1 | Applied | |
| 2 | Reserved | |
| 3 | Invalid value | |

Remarks

N/A 3.2.2.11. Estimated Gliding Acceleration

Acceleration calculated in VP in case that throttle is closed, considering slope, road load and etc.

Values

[unit: m/s$^2$]

Remarks

When the Propulsion Direction Status is "D", acceleration for forward direction shows a positive value.

When the Propulsion Direction Status is "R", acceleration for reverse direction shows a positive value.

3.2.2.12. Estimated Maximum Acceleration

Acceleration calculated in VP in case that throttle is fully open, considering slope, road load and etc.

Values

[unit: m/s$^2$]

Remarks

When the Propulsion Direction Status is "D", acceleration for forward direction shows a positive value.

When the Propulsion Direction Status is "R", acceleration for reverse direction shows a positive value.

3.2.2.13. Estimated Maximum Deceleration

Maximum deceleration calculated in VP in case that brake in VP is requested as maximum, considering slope, road load and etc.

Values

[unit: m/s$^2$]

Remarks

When the Propulsion Direction Status is "D", deceleration for forward direction shows a negative value.

When the Propulsion Direction Status is "R", deceleration for reverse direction shows a negative value.

3.2.2.14. Front Wheel Steer Angle

| Values | | |
|---|---|---|
| Value | Description | Remarks |
| Minimum Value | Invalid value | |
| others | [unit: rad] | |

Remarks

Left is positive value (+). Right is negative value (−).

This signal should show invalid value until VP can calculate correct value or when the sensor is invalid/failed.

3.2.2.15. Front Wheel Steer Angle Rate

Front wheel steer angle rate

| Values | | |
|---|---|---|
| Value | Description | Remarks |
| Minimum Value | Invalid value | |
| others | [unit: rad/s] | |

Remarks

Left is positive value (+). Right is negative value (−).

This signal should show invalid value until VP can calculate correct value or when Front wheel steer angle shows the minimum value.

3.2.2.16. Front Wheel Steer Angle Rate Limitation

The limit of the Front wheel steer angle rate

Values

[unit: rad/s]

Remarks

Figure 19:
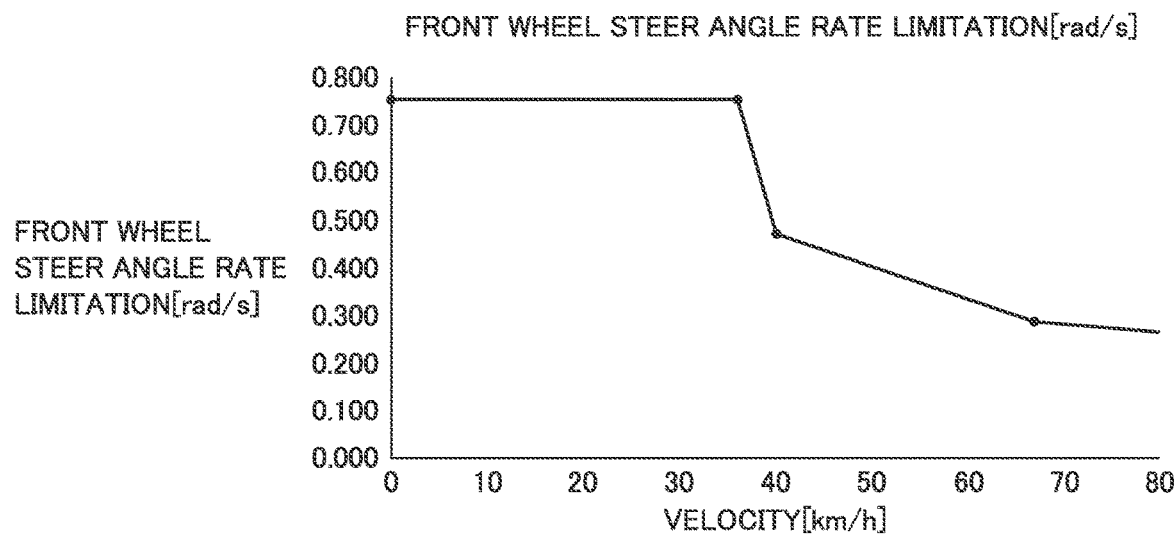
FIG. 19 is a diagram showing relation between a front wheel steer angle rate limitation and a velocity.

The limitation is calculated from the "vehicle speed—steering angle rate" map as shown in following Table 5 and FIG. 19.

A) At a low speed or stopped situation, use fixed value (0.751 [rad/s]).

B) At a higher speed, the steering angle rate is calculated from the vehicle speed using 3.432 m/s$^3$.

TABLE 5

| "vehicle speed—steering angle rate" map | | | | | |
|---|---|---|---|---|---|
| Velocity [km/h] | 0.0 | 36.0 | 40.0 | 67.0 | 84.0 |
| Front Wheel Steer Angle Rate Limitation [rad/s] | 0.751 | 0.751 | 0.469 | 0.287 | 0.253 |

3.2.2.17. Estimated maximum lateral acceleration

Values

[unit: m/s$^2$] (fixed value: 3.432)

Remarks

Maximum lateral acceleration defined for VP.

3.2.2.18. Estimated Maximum Lateral Acceleration Rate

Values

[unit: m/s$^3$] (fixed value: 3.432)

Remarks

Maximum lateral acceleration rate defined for VP.

3.2.2.19. Intervention of Accelerator Pedal

This signal shows whether the accelerator pedal is depressed by a driver (intervention).

| Values | | |
|---|---|---|
| Value | Description | Remarks |
| 0 | Not depressed | |
| 1 | depressed | |
| 2 | Beyond autonomy acceleration | |

Remarks

When a position of accelerator pedal is higher than a defined threshold, this signal is set to "depressed".

When the requested acceleration calculated from a position of accelerator pedal is higher than the requested acceleration from ADS, this signal is set as "Beyond autonomy acceleration."

3.2.2.20. Intervention of Brake Pedal

This signal shows whether the brake pedal is depressed by a driver (intervention).

| Values | | |
|---|---|---|
| Value | Description | Remarks |
| 0 | Not depressed | |
| 1 | depressed | |
| 2 | Beyond autonomy deceleration | |

Remarks

When a position of brake pedal is higher than the defined threshold value, this signal is set to "depressed".

When the requested deceleration calculated from a position of brake pedal is higher than the requested deceleration from ADS, this signal is set as "Beyond autonomy deceleration".

3.2.2.21. Intervention of Steering Wheel

This signal shows whether the steering wheel is operated by a driver (intervention).

| Values | | |
|---|---|---|
| Value | Description | Remarks |
| 0 | Not turned | |
| 1 | ADS and driver collaboratively work | |
| 2 | Only by human driver | |

Remarks

In "Intervention of steering wheel=1", considering the human driver's intent, EPS system drives the steering with the Human driver collaboratively.

In "Intervention of steering wheel=2", considering the human driver's intent, the steering request from ADS is not achieved. (The steering will be driven by human driver.)

3.2.2.22. Intervention of Shift Lever

This signal shows whether the shift lever is controlled by a driver (intervention)

| Values | | |
|---|---|---|
| Value | Description | Remarks |
| 0 | OFF | |
| 1 | ON | Controlled (moved to any shift position) |

Remarks

N/A

3.2.2.23. Wheel speed pulse (front left), Wheel speed pulse (front right), Wheel speed pulse (rear left), Wheel speed pulse (rear right)

| Values | | |
|---|---|---|
| Value | Description | Remarks |
| Maximum Value in transmission bits | Invalid value | The sensor is invalid. |
| others | ticks [unit: —] | The number of pulses per one round wheel depends on VP. |

Remarks

A pulse value is integrated at the pulse falling timing.

This wheel speed sensor outputs 96 pulses with a single rotation.

- Regardless of invalid/failure of wheel speed sensor, wheel speed pulse will be updated.
- When "1" is subtracted from a pulse value which shows "0", the value changes to "0xFF". When "1" is added to a pulse value which shows "0xFF", the value changes to "0".
- Until the rotation direction is determined just after ECU is activated, a pulse value will be added as the rotation direction is "Forward".
- When detected forward rotation, a pulse value will be added.
- When detected reverse rotation, a pulse value will be subtracted.

3.2.2.24. Wheel rotation direction (front left), Wheel rotation direction (front right), Wheel rotation direction (Rear left), Wheel rotation direction (Rear right)

| Values | | |
|---|---|---|
| Value | Description | Remarks |
| 0 | Forward | |
| 1 | Reverse | |
| 2 | Reserved | |
| 3 | Invalid value | The sensor is invalid. |

"Forward" is set until the rotation direction is determined after VP is turned on.

3.2.2.25. Traveling Direction

Moving Direction of Vehicle

| Values | | |
|---|---|---|
| Value | Description | Remarks |
| 0 | Forward | |
| 1 | Reverse | |
| 2 | Standstill | |
| 3 | Undefined | |

Remarks

This signal shows "Standstill" when four wheel speed values are "O" during a constant time.

When shift is changed right after vehicle starts, it is possible to be "Undefined".

3.2.2.26. Vehicle Velocity

Estimated Longitudinal Velocity of Vehicle

| Values | | |
|---|---|---|
| Value | Description | Remarks |
| Maximum Value in transmission bits | Invalid value | The sensor is invalid. |
| others | Velocity [unit: m/s] | |

Remarks

The value of this signal is a positive value when both forward direction and reverse direction.

3.2.2.27. Longitudinal acceleration

Estimated longitudinal acceleration of vehicle

| Values | | |
|---|---|---|
| Value | Description | Remarks |
| Minimum Value in transmission bits | Invalid value | The sensor is invalid. |
| others | Acceleration [unit: $m/s^2$] | |

Remarks

Acceleration (+) and deceleration (−) value based on Propulsion Direction Status direction.

3.2.2.28. Lateral Acceleration

Lateral Acceleration of Vehicle

| Values | | |
|---|---|---|
| Value | Description | Remarks |
| Minimum Value in transmission bits | Invalid value | The sensor is invalid. |
| others | Acceleration [unit: $m/s^2$] | |

A positive value shows counterclockwise. A negative value shows clockwise.

3.2.2.29. Yaw Rate

Sensor Value of Yaw Rate

| Values | | |
|---|---|---|
| Value | Description | Remarks |
| Minimum Value in transmission bits | Invalid value | The sensor is invalid. |
| others | Yaw rate [unit: deg/s] | |

Remarks

A positive value shows counterclockwise. A negative value shows clockwise.

3.2.2.30. Slipping Detection

Detection of Tire Glide/Spin/Skid

| Values | | |
|---|---|---|
| Value | Description | Remarks |
| 0 | Not Slipping | |
| 1 | Slipping | |
| 2 | Reserved | |
| 3 | Invalid value | |

Remarks

This signal is determined as "Slipping" when any of the following systems has been activated.

ABS (Anti-lock Braking System)

TRC (TRaction Control)

VSC (Vehicle Stability Control)

VDIM (Vehicle Dynamics Integrated Management)

3.2.2.31. Vehicle mode state

Autonomous or manual mode

| Values | | |
|---|---|---|
| Value | Description | Remarks |
| 0 | Manual Mode | The mode starts from Manual mode. |
| 1 | Autonomous Mode | |

Remarks

The initial state is set to "Manual Mode."

3.2.2.32. Readiness for Autonomization

This signal shows whether a vehicle can change to Autonomous Mode or not

| Values | | |
|---|---|---|
| Value | Description | Remarks |
| 0 | Not Ready For Autonomous Mode | |
| 1 | Ready For Autonomous Mode | |
| 3 | Invalid | The status is not determined yet. |

Remarks

N/A 3.2.2.33. Failure Status of VP Functions for Autonomous Mode

This signal is used to show whether VP functions have some failures mode when a vehicle works as Autonomous Mode.

| Values | | |
|---|---|---|
| Value | Description | Remarks |
| 0 | No fault | |
| 1 | Fault | |
| 3 | Invalid | The status is not determined yet. |

Remarks

N/A 3.2.2.34. PCS Alert Status

| Values | | |
|---|---|---|
| Value | Description | Remarks |
| 0 | Normal | |
| 1 | Alert | Request alert from PCS system |
| 3 | Unavailable | |

Remarks

N/A 3.2.2.35. PCS Preparation Status

Prefill Status as the preparation of PCS Brake

| Values | | |
|---|---|---|
| Value | Description | Remarks |
| 0 | Normal | |
| 1 | Active | |
| 3 | Unavailable | |

"Active" is a status in which PCS prepares brake actuator to shorten the latency from a deceleration request issued by PCS.

When a value turns to "Active" during Vehicle mode state="Autonomous Mode," "ADS/PCS arbitration status" shows "ADS".

3.2.2.36. PCS Brake/PCS Brake Hold Status

| Values | | |
|---|---|---|
| Value | Description | Remarks |
| 0 | Normal | |
| 1 | PCS Brake | |
| 2 | PCS Brake Hold | |
| 7 | Unavailable | |

Remarks
    N/A 3.2.2.37. ADS/PCS Arbitration Status

Arbitration Status

| Values | | |
|---|---|---|
| Value | Description | Remarks |
| 0 | No Request | |
| 1 | ADS | ADS |
| 2 | PCS | PCS Brake or PCS Brake Hold |
| 3 | Invalid value | |

Remarks

When acceleration requested by PCS system in VP is smaller than one requested by ADS, the status is set as "PCS".

When acceleration requested by PCS system in VP is larger than one requested by ADS, the status is set as "ADS".

3.3. APIs for BODY Control 3.3.1. API List for BODY Control 3.3.1.1. Inputs

TABLE 6

| Input APIs for BODY Control | | |
|---|---|---|
| Signal Name | Description | Redundancy |
| Turnsignal command | Command to control the turnsignallight mode of the vehicle platform | N/A |
| Headlight command | Command to control the headlight mode of the vehicle platform | N/A |
| Hazardlight command | Command to control the hazardlight mode of the vehicle platform | N/A |
| Horn pattern command | Command to control the pattern of horn ON-time and OFF-time per cycle of the vehicle platform | N/A |
| Horn cycle command | Command to control the number of horn ON/OFF cycles of the vehicle platform | N/A |
| Continuous horn command | Command to control of horn ON of the vehicle platform | N/A |
| Front windshield wiper command | Command to control the front windshield wiper of the vehicle platform | N/A |
| Rear windshield wiper command | Command to control the rear windshield wiper mode of the vehicle platform | N/A |
| HVAC (1st row) operation command | Command to start/stop 1st row air conditioning control | N/A |
| HVAC (2nd row) operation command | Command to start/stop 2nd row air conditioning control | N/A |
| Target temperature (1st left) command | Command to set the target temperature around front left area | N/A |
| Target temperature (1st right) command | Command to set the target temperature around front right area | N/A |
| Target temperature (2nd left) command | Command to set the target temperature around rear left area | N/A |
| Target temperature (2nd right) command | Command to set the target temperature around rear right area | N/A |
| HVAC fan (1st row) command | Command to set the fan level on the front AC | N/A |
| HVAC fan (2nd row) command | Command to set the fan level on the rear AC | N/A |
| Air outlet (1st row) command | Command to set the mode of 1st row air outlet | N/A |
| Air outlet (2nd row) command | Command to set the mode of 2nd row air outlet | N/A |
| Air recirculation command | Command to set the air recirculation mode | N/A |
| AC mode command | Command to set the AC mode | N/A |

3.3.1.2. Outputs

TABLE 7

Output APIs for BODY Control

| Signal Name | Description | Redundancy |
|---|---|---|
| Turnsignal status | Status of the current turnsignallight mode of the vehicle platform | N/A |
| Headlight status | Status of the current headlight mode of the vehicle platform | N/A |
| Hazardlight status | Status of the current hazardlight mode of the vehicle platform | N/A |
| Horn status | Status of the current horn of the vehicle platform | N/A |
| Front windshield wiper status | Status of the current front windshield wiper mode of the vehicle platform | N/A |
| Rear windshield wiper status | Status of the current rear windshield wiper mode of the vehicle platform | N/A |
| HVAC (1st row) status | Status of activation of the $1^{st}$ row HVAC | N/A |
| HVAC (2nd row) status | Status of activation of the $2^{nd}$ row HVAC | N/A |
| Target temperature (1st left) status | Status of set temperature of $1^{st}$ row left | N/A |
| Target temperature (1st right) status | Status of set temperature of $1^{st}$ row right | N/A |
| Target temperature (2nd left) status | Status of set temperature of $2^{nd}$ row left | N/A |
| Target temperature (2nd right) status | Status of set temperature of $2^{nd}$ row right | N/A |
| HVAC fan (1st row) status | Status of set fan level of $1^{st}$ row | N/A |
| HVAC fan (2nd row) status | Status of set fan level of $2^{nd}$ row | N/A |
| Air outlet (1st row) status | Status of mode of 1st row air outlet | N/A |
| Air outlet (2nd row) status | Status of mode of 2nd row air outlet | N/A |
| Air recirculation status | Status of set air recirculation mode | N/A |
| AC mode status | Status of set AC mode | N/A |
| Seat occupancy (1st right) status | Seat occupancy status in 1st right seat | N/A |
| Seat belt (1st left) status | Status of driver's seat belt buckle switch | N/A |
| Seat belt (1st right) status | Status of passenger's seat belt buckle switch | N/A |
| Seat belt (2nd left) status | Seat belt buckle switch status in 2nd left seat | N/A |
| Seat belt (2nd right) status | Seat belt buckle switch status in 2nd right seat | N/A |
| Seat belt (3rd left) status | Seat belt buckle switch status in 3rd left seat | N/A |
| Seat belt (3rd center) status | Seat belt buckle switch status in 3rd center seat | N/A |
| Seat belt (3rd right) status | Seat belt buckle switch status in 3rd right seat | N/A |

3.3.2. Details of Each API for BODY Control
3.3.2.1. Turnsignal Command
Request to Control Turn-Signal

| Values | | |
|---|---|---|
| Value | Description | Remarks |
| 0 | OFF | |
| 1 | Right | Right blinker ON |
| 2 | Left | Left blinker ON |
| 3 | Reserved | |

Remarks
  N/A

3.3.2.2. Headlight Command
Request to Control Headlight

| Values | | |
|---|---|---|
| Value | Description | Remarks |
| 0 | No Request | Keep current mode |
| 1 | TAIL mode request | Side lamp mode |
| 2 | HEAD mode request | Lo mode |
| 3 | AUTO mode request | Auto mode |
| 4 | HI mode request | Hi mode |
| 5 | OFF Mode Request | |
| 6-7 | Reserved | |

Remarks
  This command is valid when headlight mode on the combination switch="OFF" or "Auto mode=ON."
  Driver operation overrides this command.

3.3.2.3. Hazardlight Command
Request to Control Hazardlight

| Values | | |
|---|---|---|
| Value | Description | Remarks |
| 0 | No Request | |
| 1 | ON | |

Remarks
  Driver operation overrides this command.
  Hazardlight is ON while receiving "ON" command.

3.3.2.4. Horn Pattern Command
Request to choose a pattern of ON-time and OFF-time per cycle

| Values | | |
|---|---|---|
| Value | Description | Remarks |
| 0 | No request | |
| 1 | Pattern 1 | ON-time: 250 ms OFF-time: 750 ms |
| 2 | Pattern 2 | ON-time: 500 ms OFF-time: 500 ms |

| Values | | |
|---|---|---|
| Value | Description | Remarks |
| 3 | Pattern 3 | Reserved |
| 4 | Pattern 4 | Reserved |
| 5 | Pattern 5 | Reserved |
| 6 | Pattern 6 | Reserved |
| 7 | Pattern 7 | Reserved |

Remarks
N/A 3.3.2.5. Horn Cycle Command

Request to choose the number of ON and OFF cycles

Values
0 to 7 [-]

Remarks
N/A 3.3.2.6. Continuous Horn Command

Request to turn on/off horn

| Values | | |
|---|---|---|
| Value | Description | Remarks |
| 0 | No request | |
| 1 | ON | |

Remarks
This command's priority is higher than 3.3.2.4 Horn pattern and 3.3.2.5 Horn cycle command.
Horn is "ON" while receiving "ON" command.

3.3.2.7. Front Windshield Wiper Command

Request to control front windshield wiper

| Values | | |
|---|---|---|
| Value | Description | Remarks |
| 0 | OFF mode request | |
| 1 | Lo mode request | |
| 2 | Hi mode request | |
| 3 | Intermittent mode request | |
| 4 | Auto mode request | |
| 5 | Mist mode request | One-time wiping |
| 6, 7 | Reserved | |

Remarks
This command is valid when front windshield wiper mode on a combination switch is "OFF" or "AUTO".
Driver input overrides this command.
Windshieldwiper mode is kept while receiving a command.
Wiping speed of intermittent mode is fixed.

3.3.2.8. Rear Windshield Wiper Command

Request to control rear windshield wiper

| Values | | |
|---|---|---|
| Value | Description | Remarks |
| 0 | OFF mode request | |
| 1 | Lo mode request | |
| 2 | Reserved | |

| Values | | |
|---|---|---|
| Value | Description | Remarks |
| 3 | Intermittent mode request | |
| 4-7 | Reserved | |

Remarks
Driver input overrides this command
Windshieldwiper mode is kept while receiving a command.
Wiping speed of intermittent mode is fixed.

3.3.2.9. HVAC (1st Row) Operation Command

Request to start/stop 1st row air conditioning control

| Values | | |
|---|---|---|
| Value | Description | Remarks |
| 0 | No request | |
| 1 | ON | |
| 2 | OFF | |

Remarks
N/A 3.3.2.10. HVAC (2nd Row) Operation Command

Request to start/stop 2nd row air conditioning control

| Values | | |
|---|---|---|
| Value | Description | Remarks |
| 0 | No request | |
| 1 | ON | |
| 2 | OFF | |

Remarks
N/A 3.3.2.11. Target Temperature (1st Left) Command

Request to set target temperature in front left area

| Values | | |
|---|---|---|
| Value | Description | Remarks |
| 0 | No request | |
| 60 to 85 [unit: ° F.] (by 1.0° F.) | Target temperature | |

Remarks
In case ° C. is used in VP, value should be set as ° C.

3.3.2.12. Target Temperature (1st Right) Command

Request to set target temperature in front right area

| Values | | |
|---|---|---|
| Value | Description | Remarks |
| 0 | No request | |
| 60 to 85 [unit: ° F.] (by 1.0° F.) | Target temperature | |

Remarks

In case ° C. is used in VP, value should be set as ° C.

3.3.2.13. Target Temperature (2nd Left) Command

Request to set target temperature in rear left area

| Values | | |
|---|---|---|
| Value | Description | Remarks |
| 0 | No request | |
| 60 to 85 [unit: ° F.] (by 1.0° F.) | Target temperature | |

Remarks

In case ° C. is used in VP, value should be set as ° C.

3.3.2.14. Target Temperature (2nd Right) Command

Request to set target temperature in rear right area

| Values | | |
|---|---|---|
| Value | Description | Remarks |
| 0 | No request | |
| 60 to 85 [unit: ° F.] (by 1.0° F.) | Target temperature | |

Remarks

In case ° C. is used in VP, value should be set as ° C.

3.3.2.15. HVAC fan (1st row) command

Request to set fan level of front AC

| Values | | |
|---|---|---|
| Value | Description | Remarks |
| 0 | No request | |
| 1 to 7 (Maximum) | Fan level | |

Remarks

If you would like to turn the fan level to 0 (OFF), you should transmit "HVAC (1st row) operation command=OFF."

If you would like to turn the fan level to AUTO, you should transmit "HVAC (1st row) operation command=ON."

3.3.2.16. HVAC Fan (2nd Row) Command

Request to set fan level of rear AC

| Values | | |
|---|---|---|
| Value | Description | Remarks |
| 0 | No request | |
| 1 to 7 (Maximum) | Fan level | |

If you would like to turn the fan level to 0 (OFF), you should transmit "HVAC (2nd row) operation command=OFF."

If you would like to turn the fan level to AUTO, you should transmit "HVAC (2nd row) operation command=ON."

3.3.2.17. Air Outlet (1st Row) Command

Request to set 1st row air outlet mode

| Values | | |
|---|---|---|
| Value | Description | Remarks |
| 0 | No Operation | |
| 1 | UPPER | Air flows to upper body |
| 2 | U/F | Air flows to upper body and feet |
| 3 | FEET | Air flows to feet |
| 4 | F/D | Air flows to feet and windshield defogger |

Remarks

N/A 3.3.2.18. Air Outlet (2nd Row) Command

Request to set 2nd row air outlet mode

| Values | | |
|---|---|---|
| Value | Description | Remarks |
| 0 | No Operation | |
| 1 | UPPER | Air flows to upper body |
| 2 | U/F | Air flows to the upper body and feet |
| 3 | FEET | Air flows to feet. |

Remarks

N/A 3.3.2.19. Air Recirculation Command

Request to set air recirculation mode

| Values | | |
|---|---|---|
| Value | Description | Remarks |
| 0 | No request | |
| 1 | ON | |
| 2 | OFF | |

Remarks

N/A 3.3.2.20. AC Mode Command

Request to set AC mode

| Values | | |
|---|---|---|
| Value | Description | Remarks |
| 0 | No request | |
| 1 | ON | |
| 2 | OFF | |

Remarks

N/A 3.3.2.21. Turnsignal Status

| Values | | |
|---|---|---|
| Value | Description | Remarks |
| 0 | OFF | |
| 1 | Left | |
| 2 | Right | |
| 3 | Invalid | |

Remarks
  N/A

3.3.2.22. Headlight Status

| Values | | |
|---|---|---|
| Value | Description | Remarks |
| 0 | OFF | |
| 1 | TAIL | |
| 2 | Lo | |
| 3 | Reserved | |
| 4 | Hi | |
| 5-6 | Reserved | |
| 7 | Invalid | |

Remarks
  N/A

3.3.2.23. Hazardlight Status

| Values | | |
|---|---|---|
| Value | Description | Remarks |
| 0 | OFF | |
| 1 | Hazard | |
| 2 | Reserved | |
| 3 | Invalid | |

Remarks
  N/A

3.3.2.24. Horn Status

| Values | | |
|---|---|---|
| Value | Description | Remarks |
| 0 | OFF | |
| 1 | ON | |
| 2 | Reserved | |
| 3 | Invalid | |

Remarks
  In the case that 3.3.2.4 the Horn Pattern Command is active, the Horn status is "1" even if there are OFF periods in some patterns.

3.3.2.25. Front Windshield Wiper Status

| Values | | |
|---|---|---|
| Value | Description | Remarks |
| 0 | OFF | |
| 1 | Lo | |
| 2 | Hi | |
| 3 | INT | |
| 4-5 | Reserved | |
| 6 | Fail | |
| 7 | Invalid | |

Remarks
  N/A

3.3.2.26. Rear Windshield Wiper Status

| Values | | |
|---|---|---|
| Value | Description | Remarks |
| 0 | OFF | |
| 1 | Lo | |
| 2 | Reserved | |
| 3 | INT | |
| 4-5 | Reserved | |
| 6 | Fail | |
| 7 | Invalid | |

Remarks
  N/A

3.3.2.27. HVAC (1st Row) Status

| Values | | |
|---|---|---|
| Value | Description | Remarks |
| 0 | OFF | |
| 1 | ON | |

Remarks
  N/A

3.3.2.28. HVAC (2nd Row) Status

| Values | | |
|---|---|---|
| Value | Description | Remarks |
| 0 | OFF | |
| 1 | ON | |

Remarks
  N/A

3.3.2.29. Target Temperature (1st Left) Status

| Values | | |
|---|---|---|
| Value | Description | Remarks |
| 0 | Lo | Max cold |
| 60 to 85 [unit: ° F.] | Target temperature | |
| 100 | Hi | Max hot |
| FFh | Unknown | |

Remarks
  In case ° C. is used in VP, value should be set as ° C.

3.3.2.30. Target Temperature (1st Right) Status

| Values | | |
|---|---|---|
| Value | Description | Remarks |
| 0 | Lo | Max cold |
| 60 to 85 [unit: ° F.] | Target temperature | |
| 100 | Hi | Max hot |
| FFh | Unknown | |

Remarks

In case ° C. is used in VP, value should be set as ° C.

3.3.2.31. Target Temperature (2nd Left) Status

| Values | | |
|---|---|---|
| Value | Description | Remarks |
| 0 | Lo | Max cold |
| 60 to 85 [unit: ° F.] | Target temperature | |
| 100 | Hi | Max hot |
| FFh | Unknown | |

Remarks

In case ° C. is used in VP, value should be set as ° C.

3.3.2.32. Target Temperature (2nd Right) Status

| Values | | |
|---|---|---|
| Value | Description | Remarks |
| 0 | Lo | Max cold |
| 60 to 85 [unit: ° F.] | Target temperature | |
| 100 | Hi | Max hot |
| FFh | Unknown | |

Remarks

In case ° C. is used in VP, value should be set as ° C.

3.3.2.33. HVAC Fan (1st Row) Status

| Values | | |
|---|---|---|
| Value | Description | Remarks |
| 0 | OFF | |
| 1 to 7 | Fan Level | |
| 8 | Undefined | |

Remarks

N/A

3.3.2.34. HVAC Fan (2nd Row) Status

| Values | | |
|---|---|---|
| Value | Description | Remarks |
| 0 | OFF | |
| 1 to 7 | Fan Level | |
| 8 | Undefined | |

Remarks

N/A

3.3.2.35. Air Outlet (1st Row) Status

| Values | | |
|---|---|---|
| Value | Description | Remarks |
| 0 | ALL OFF | |
| 1 | UPPER | Air flows to upper body |
| 2 | U/F | Air flows to upper body and feet |
| 3 | FEET | Air flows to feet. |
| 4 | F/D | Air flows to feet and windshield defogger operates |
| 5 | DEF | Windshield defogger |
| 7 | Undefined | |

3.3.2.36. Air Outlet (2nd Row) Status

| Values | | |
|---|---|---|
| Value | Description | Remarks |
| 0 | ALL OFF | |
| 1 | UPPER | Air flows to upper body |
| 2 | U/F | Air flows to upper body and feet |
| 3 | FEET | Air flows to feet. |
| 7 | Undefined | |

Remarks

N/A

3.3.2.37. Air Recirculation Status

| Values | | |
|---|---|---|
| Value | Description | Remarks |
| 0 | OFF | |
| 1 | ON | |

Remarks

N/A

3.3.2.38. AC Mode Status

| Values | | |
|---|---|---|
| Value | Description | Remarks |
| 0 | OFF | |
| 1 | ON | |

Remarks

N/A

3.3.2.39. Seat Occupancy (1st Right) Status

| Values | | |
|---|---|---|
| Value | Description | Remarks |
| 0 | Not occupied | |
| 1 | Occupied | |
| 2 | Undecided | In case of IG OFF or communication disruption to seat sensor |
| 3 | Failed | |

Remarks

When there is luggage on the seat, this signal may be set as "Occupied".

3.3.2.40. Seat Belt (1st Left) Status

| Values | | |
|---|---|---|
| Value | Description | Remarks |
| 0 | Buckled | |
| 1 | Unbuckled | |
| 2 | Undetermined | In case where sensor does not work just after IG-ON |
| 3 | Fault of a switch | |

Remarks
  N/A 3.3.2.41. Seat Belt (1st Right) Status

| Values | | |
|---|---|---|
| Value | Description | Remarks |
| 0 | Buckled | |
| 1 | Unbuckled | |
| 2 | Undetermined | In case where sensor does not work just after IG-ON |
| 3 | Fault of a switch | |

Remarks
  N/A 3.3.2.42. Seat Belt (2nd Left) Status

| Values | | |
|---|---|---|
| Value | Description | Remarks |
| 0 | Buckled | |
| 1 | Unbuckled | |
| 2 | Undetermined | In case where sensor does not work just after IG-ON |
| 3 | Reserved | |

Remarks
  cannot detect sensor failure 3.3.2.43. Seat Belt (2nd Right) Status

| Values | | |
|---|---|---|
| Value | Description | Remarks |
| 0 | Buckled | |
| 1 | Unbuckled | |
| 2 | Undetermined | In case where sensor does not work just after IG-ON |
| 3 | Reserved | |

Remarks
  cannot detect sensor failure 3.3.2.44. Seat Belt (3rd Left) Status

| Values | | |
|---|---|---|
| Value | Description | Remarks |
| 0 | Buckled | |
| 1 | Unbuckled | |
| 2 | Undetermined | In case where sensor does not work just after IG-ON |
| 3 | Reserved | |

Remarks
  cannot detect sensor failure 3.3.2.45. Seat Belt (3rd Center) Status

| Values | | |
|---|---|---|
| Value | Description | Remarks |
| 0 | Buckled | |
| 1 | Unbuckled | |
| 2 | Undetermined | In case where sensor does not work just after IG-ON |
| 3 | Reserved | |

Remarks
  cannot detect sensor failure 3.3.2.46. Seat Belt (3rd Right) Status

| Values | | |
|---|---|---|
| Value | Description | Remarks |
| 0 | Buckled | |
| 1 | Unbuckled | |
| 2 | Undetermined | In case where sensor does not work just after IG-ON |
| 3 | Reserved | |

Remarks
  cannot detect sensor failure 3.4. APIs for Power Control 3.4.1. API List for Power Control 3.4.1.1. Inputs

TABLE 8

| Input APIs for Power control | | |
|---|---|---|
| Signal Name | Description | Redundancy |
| Power mode command | Command to control the power mode of VP | N/A |

3.4.1.2. Outputs

TABLE 9

| Output APIs for Power control | | |
|---|---|---|
| Signal Name | Description | Redundancy |
| Power mode status | Status of the current power mode of VP | N/A |

3.4.2. Details of Each API for Power Control 3.4.2.1. Power Mode Command

Request to control power mode

| Values | | |
|---|---|---|
| Value | Description | Remarks |
| 0 | No request | |
| 1 | Sleep | Turns OFF the vehicle |
| 2 | Wake | Turns ON VCIB |
| 3 | Reserved | Reserved for data expansion |
| 4 | Reserved | Reserved for data expansion |
| 5 | Reserved | Reserved for data expansion |
| 6 | Drive | Turns ON the vehicle |

Figure 20:
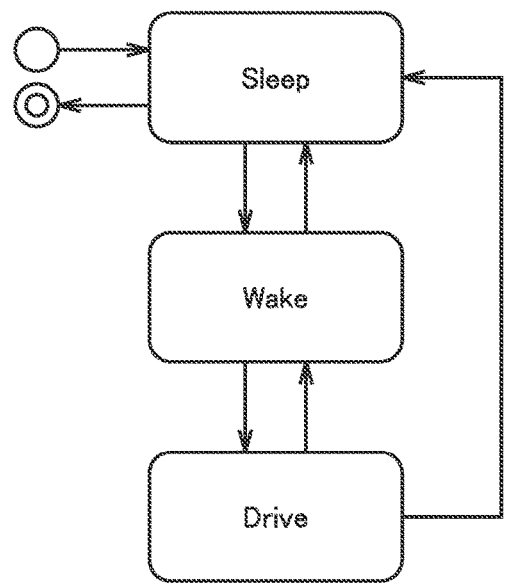
FIG. 20 is a state machine diagram of the power mode.

Remarks
  The state machine diagram of the power modes is shown in FIG. 20.

[Sleep]

Vehicle power off condition. In this mode, the main battery does not supply power to each system, and neither VCIB nor other VP ECUs are activated.

[Wake]

VCIB is awake by the auxiliary battery. In this mode, ECUs other than VCIB are not awake except for some of the body electrical ECUs.

[Driving Mode]

Vehicle power on condition. In this mode, the main battery supplies power to the whole VP and all the VP ECUs including VCIB are awake.

3.4.2.2. Power Mode Status

| | Values | |
|---|---|---|
| Value | Description | Remarks |
| 0 | Reserved | |
| 1 | Sleep | |
| 2 | Wake | |
| 3 | Reserved | |
| 4 | Reserved | |
| 5 | Reserved | |
| 6 | Drive | |
| 7 | Unknown | means unhealthy situation would occur |

Remarks

VCIB will transmit [Sleep] as Power_Mode_Status continuously for 3000 [ms] after executing the sleep sequence. And then, VCIB will shut down.

ADS should stop transmitting signals to VCIB while VCIB is transmitting [Sleep].

3.5. APIs for Failure Notification 3.5.1. API List for Failure Notification 3.5.1.1. Inputs

TABLE 10

| Input APIs for Failure Notification | | |
|---|---|---|
| Signal Name | Description | Redundancy |
| N/A | N/A | N/A |

3.5.1.2. Outputs

TABLE 11

| Output APIs for Failure Notification | | |
|---|---|---|
| Signal Name | Description | Redundancy |
| Request for ADS operation | | Applied |
| Impact detection signal | | N/A |
| Performance deterioration of brake system | | Applied |
| Performance deterioration of propulsion system | | N/A |
| Performance deterioration of shift control system | | N/A |
| Performance deterioration of immobilization system | | Applied |
| Performance deterioration of steering system | | Applied |
| Performance deterioration of power supply system | | Applied |
| Performance deterioration of communication system | | Applied |

3.5.2. Details of each API for Failure Notification 3.5.2.1. Request for ADS Operation

| | Values | |
|---|---|---|
| Value | Description | Remarks |
| 0 | No request | |
| 1 | Need maintenance | |
| 2 | Need to be back to garage | |
| 3 | Need to stop immediately | |
| Others | Reserved | |

Remarks

This signal shows a behavior which the ADS is expected to do according to a failure which happened in the VP.

3.5.2.2. Impact Detection Signal

| | Values | |
|---|---|---|
| Value | Description | Remarks |
| 0 | Normal | |
| 5 | Crash detection with activated airbag | |
| 6 | Crash detection with shut off high voltage circuit | |
| 7 | Invalid value | |
| Others | Reserved | |

Remarks

When the event of crash detection is generated, the signal is transmitted 50 consecutive times every 100 [ms]. If the crash detection state changes before the signal transmission is completed, the high signal of priority is transmitted.

Priority: crash detection>normal

Transmits for 5 s regardless of ordinary response at crash, because the vehicle breakdown judgment system shall be sent a voltage OFF request for 5 s or less after crash in HV vehicle.

Transmission interval is 100 ms within fuel cutoff motion delay allowance time (1 s) so that Data can be Transmitted More than 5 Times.

In this case, an instantaneous power interruption is taken into account.

3.5.2.3. Performance Deterioration of Brake System

| | Values | |
|---|---|---|
| Value | Description | Remarks |
| 0 | Normal | — |
| 1 | Deterioration detected | — |

Remarks

N/A 3.5.2.4. Performance Deterioration of Propulsion System

| | Values | |
|---|---|---|
| Value | Description | Remarks |
| 0 | Normal | — |
| 1 | Deterioration detected | — |

Remarks

N/A

3.5.2.5. Performance Deterioration of Shift Control System

| Values | | |
|---|---|---|
| Value | Description | Remarks |
| 0 | Normal | — |
| 1 | Deterioration detected | — |

Remarks

N/A

3.5.2.6. Performance Deterioration of Immobilization System

| Values | | |
|---|---|---|
| Value | Description | Remarks |
| 0 | Normal | — |
| 1 | Deterioration detected | — |

Remarks

N/A

3.5.2.7. Performance Deterioration of Steering System

| Values | | |
|---|---|---|
| Value | Description | Remarks |
| 0 | Normal | — |
| 1 | Deterioration detected | — |

Remarks

N/A

3.5.2.8. Performance Deterioration of Power Supply System

| Values | | |
|---|---|---|
| Value | Description | Remarks |
| 0 | Normal | — |
| 1 | Deterioration detected | — |

Remarks

N/A

3.5.2.9. Performance Deterioration of Communication System

| Values | | |
|---|---|---|
| Value | Description | Remarks |
| 0 | Normal | — |
| 1 | Deterioration detected | — |

Remarks

N/A

3.6. APIs for Security

3.6.1. API List for Security

3.6.1.1. Inputs

TABLE 12

| Input APIs for Security | | |
|---|---|---|
| Signal Name | Description | Redundancy |
| Door Lock (front) command | Command to control both 1st doors lock | N/A |
| Door Lock (rear) command | Command to control both 2nd doors and trunk lock | N/A |
| Central door lock command | Command to control the all door lock | N/A |
| Device Authentication Signature the 1st word | This is the 8th byte from the 1st byte of the Signature value. | N/A |
| Device Authentication Signature the 2nd word | This is the 16th byte from the 9th byte of the Signature value. | N/A |
| Device Authentication Signature the 3rd word | This is the 24th byte from the 17th byte of the Signature value. | N/A |
| Device Authentication Signature the 4th word | This is the 32th byte from the 25th byte of the Signature value. | N/A |

3.6.1.2. Outputs

TABLE 13

| Output APIs for Security | | |
|---|---|---|
| Signal Name | Description | Redundancy |
| Door lock (1st left) status | Status of the current 1st-left door lock | N/A |
| Door lock (1st right) status | Status of the current 1st-right door lock | N/A |
| Door lock (2nd left) status | Status of the current 2nd-left door lock | N/A |
| Door lock (2nd right) status | Status of the current 2nd-right door lock | N/A |
| Trunk Lock status | Status of the current trunk (back door) lock | N/A |
| Central door lock status | Status of the current all door lock | N/A |
| Alarm system status | Status of the current vehicle alarm | N/A |
| Device Authentication Seed the 1st word | This is the 8th byte from the 1st byte of the Seed value. | N/A |
| Device Authentication Seed the 2nd word | This is the 16th byte from the 9th byte of the Seed value. | N/A |
| Trip Counter | This counter is incremented in units of trips by the Freshness Value management master ECU. | N/A |
| Reset Counter | This counter is incremented periodically by the Freshness Value management master ECU. | N/A |
| 1st Left Door Open Status | Status of the current 1st-left door open/close of the vehicle platform | N/A |
| 1st Right Door Open Status | Status of the current 1st-right door open/close of the vehicle platform | N/A |
| 2nd Left Door Open Status | Status of the current 2nd-left door open/close of the vehicle platform | N/A |
| 2nd Right Door Open Status | Status of the current 2nd-right door open/close of the vehicle platform | N/A |
| Trunk Status | Status of the current trunk door open of the vehicle platform | N/A |
| Hood Open Status | Status of the current hood open/close of the vehicle platform | N/A |

3.6.2. Details of Each API for Security
3.6.2.1. Door Lock (Front) Command. Door Lock (Rear) Command

| Values | | |
|---|---|---|
| Value | Description | Remarks |
| 0 | No Request | |
| 1 | Lock | Not supported in Toyota VP |
| 2 | Unlock | |
| 3 | Reserved | |

Remarks

If ADK requests for unlocking front side, both front doors are unlocked.

If ADK requests for unlocking rear side, both 2nd row and trunk doors are unlocked.

If ADK requests for locking any door, it should use "Central door lock command."

(The functionality for individual locking is not supported in Toyota VP.)

3.6.2.2. Central Door Lock Command
Request to control all doors' lock

| Values | | |
|---|---|---|
| Value | Description | Remarks |
| 0 | No Request | |
| 1 | Lock (all) | |
| 2 | Unlock (all) | |
| 3 | Reserved | |

Remarks
N/A

3.6.2.3. Device Authentication Signature the 1st word, Device Authentication Signature the 2nd word, Device Authentication Signature the 3rd word, Device Authentication Signature the 4th word, Device Authentication Seed the 1st word, Device Authentication Seed the 2nd Word Device Authentication Signature the 1st word is presented in from 1st to 8th bytes of the signature.

Device Authentication Signature the 2nd word is presented in from 9th to 16th bytes of the signature.

Device Authentication Signature the 3rd word is presented in from 17th to 24th bytes of the signature.

Device Authentication Signature the 4th word is presented in from 25th to 32nd bytes of the signature.

Device Authentication Seed the 1st word is presented in from 1st to 8th bytes of the seed.

Device Authentication Seed the 2nd word is presented in from 9th to 16th bytes of the seed.

3.6.2.4. Door Lock (1st Left) Status

| Values | | |
|---|---|---|
| Value | Description | Remarks |
| 0 | Reserved | |
| 1 | Locked | |
| 2 | Unlocked | |
| 3 | Invalid | |

Remarks
N/A

3.6.2.5. Door Lock (1st Right) Status

| Values | | |
|---|---|---|
| Value | Description | Remarks |
| 0 | Reserved | |
| 1 | Locked | |
| 2 | Unlocked | |
| 3 | Invalid | |

Remarks
N/A

3.6.2.6. Door Lock (2nd Left) Status

| Values | | |
|---|---|---|
| Value | Description | Remarks |
| 0 | Reserved | |
| 1 | Locked | |
| 2 | Unlocked | |
| 3 | Invalid | |

Remarks
N/A

3.6.2.7. Door Lock (2nd Right) Status

| Values | | |
|---|---|---|
| Value | Description | Remarks |
| 0 | Reserved | |
| 1 | Locked | |
| 2 | Unlocked | |
| 3 | Invalid | |

Remarks
N/A

3.6.2.8. Door Lock Status of all Doors

| Values | | |
|---|---|---|
| Value | Description | Remarks |
| 0 | Reserved | |
| 1 | All Locked | |
| 2 | Anything Unlocked | |
| 3 | Invalid | |

Remarks

In case any doors are unlocked. "Anything Unlocked."
In case all doors are locked. "All Locked."

3.6.2.9. Alarm System Status

| Values | | |
|---|---|---|
| Value | Description | Remarks |
| 0 | Disarmed | Alarm System is not activated. |
| 1 | Armed | Alarm System is activated without alarming. |
| 2 | Active | Alarm System is activated, and the alarm is beeping. |
| 3 | Invalid | |

Remarks
  N/A
3.6.2.9.1. Trip Counter
  This counter is incremented in a unit of trips by the Freshness Value management master ECU.
Values
  0-FFFFh
Remarks
  This value is used to create a Freshness value.
  For details, please refer to the other material [the specification of Toyota's MAC module].
3.6.2.9.2. Reset Counter
  This counter is incremented periodically by the Freshness Value management master ECU.
Values
  0-FFFFFh
Remarks
  This value is used to create a Freshness value.
  For details, please refer to the other material [the specification of Toyota's MAC module].
3.6.2.10. 1st Left Door Open Status
  Status of the current 1st-left door open/close of the vehicle platform

| Values | | |
|---|---|---|
| Value | Description | Remarks |
| 0 | Reserved | |
| 1 | Open | |
| 2 | Closes | |
| 3 | Invalid | |

Remarks
  N/A
3.6.2.11. 1st Right Door Open Status
  Status of the current 1st-right door open/close

| Values | | |
|---|---|---|
| Value | Description | Remarks |
| 0 | Reserved | |
| 1 | Open | |
| 2 | Close | |
| 3 | Invalid | |

Remarks
  N/A
3.6.2.12. 2nd Left Door Open Status
  Status of the current 2nd-left door open/close

| Values | | |
|---|---|---|
| Value | Description | Remarks |
| 0 | Reserved | |
| 1 | Open | |
| 2 | Close | |
| 3 | Invalid | |

Remarks
  N/A
3.6.2.13. 2nd Right Door Open Status
  Status of the current 2nd-right door open/close

| Values | | |
|---|---|---|
| Value | Description | Remarks |
| 0 | Reserved | |
| 1 | Open | |
| 2 | Close | |
| 3 | Invalid | |

Remarks
  N/A
3.6.2.14. Trunk Status
  Status of the current trunk door open/close

| Values | | |
|---|---|---|
| Value | Description | Remarks |
| 0 | Reserved | |
| 1 | Open | |
| 2 | Close | |
| 3 | Invalid | |

Remarks
  N/A
3.6.2.15. Hood Open Status
  Status of the current hood open/close

| Values | | |
|---|---|---|
| Value | Description | Remarks |
| 0 | Reserved | |
| 1 | Open | |
| 2 | Close | |
| 3 | Invalid | |

Remarks
  N/A
4. API Guides to control Toyota Vehicles
  This section shows in detail the way of using APIs for Toyota vehicles.
4.1. APIs for Vehicle Motion Control
4.1.1. API List for Vehicle Motion Control
  Input and output APIs for vehicle motion control are shown in Table 14 and Table 15, respectively. Usage guides of some APIs are presented in the following sections as indicated in each table.
4.1.1.1. Inputs

TABLE 14

| Input APIs for Vehicle Motion Control | | | |
|---|---|---|---|
| Signal Name | Description | Redundancy | Usage Guide |
| Propulsion Direction Command | Request for shift change from/to forward (D range) to/from back (R range) | N/A | 4.1.2.1 |
| Immobilization Command | Request for turning on/off WheelLock | Applied | 4.1.2.2 |
| Standstill Command | Request for keeping on/off stationary | Applied | 4.1.2.3 |

TABLE 14-continued

Input APIs for Vehicle Motion Control

| Signal Name | Description | Redundancy | Usage Guide |
|---|---|---|---|
| Acceleration Command | Request for acceleration/ deceleration | Applied | 4.1.2.1 4.1.2.2 4.1.2.3 4.1.2.4 |
| Front Wheel Steer Angle Command | Request for front wheel steer angle | Applied | 4.1.2.5 |
| Vehicle Mode Command | Request for changing from/ to manual mode to/from Autonomous Mode | Applied | 4.1.2.6 |
| High Dynamics Command | Request for increasing braking response performance* | Applied | — |

*Reaction time in VP upon a request from ADK

4.1.1.2. Outputs

TABLE 15

Output APIs for Vehicle Motion Control

| Signal Name | Description | Redundancy | Usage Guide |
|---|---|---|---|
| Propulsion Direction Status | Current shift status | N/A | — |
| Immobilization Status | Status of immobilization (e.g. EPB and Shift P) | Applied | 4.1.2.2 4.1.2.3 |
| Standstill Status | Standstill status | N/A | 4.1.2.3 |
| Estimated Gliding Acceleration | Estimated vehicle acceleration/ deceleration when throttle is fully closed | N/A | — |
| Estimated maximum acceleration | Estimated maximum acceleration | Applied | — |
| Estimated maximum deceleration | Estimated maximum deceleration | Applied | — |
| Front wheel steer angle | Front wheel steer angle | Applied | 4.1.2.5 |
| Front wheel steer angle rate | Front wheel steer angle rate | Applied | — |
| Front wheel steer angle rate limitation | Road wheel angle rate limit | Applied | — |
| Estimated maximum lateral acceleration | Estimated max lateral acceleration | Applied | — |
| Estimated maximum lateral acceleration rate | Estimated max lateral acceleration rate | Applied | — |
| Intervention of accelerator pedal | This signal shows whether the accelerator pedal is depressed by a driver (intervention) | N/A | 4.1.2.4 |
| Intervention of brake pedal | This signal shows whether the brake pedal is depressed by a driver (intervention) | N/A | — |
| Intervention of steering wheel | This signal shows whether the steering wheel is turned by a driver (intervention) | N/A | 4.1.2.5 |
| Intervention of shift lever | This signal shows whether the shift lever is controlled by a driver (intervention) | N/A | — |
| Wheel speed pulse (front left) | Pulse from wheel speed sensor (Front Left Wheel) | N/A | — |
| Wheel rotation direction (front left) | Rotation direction of wheel (Front Left) | N/A | — |
| Wheel speed pulse (front right) | Pulse from wheel speed sensor (Front Right Wheel) | N/A | — |
| Wheel rotation direction (front right) | Rotation direction of wheel (Front Right) | N/A | — |
| Wheel speed pulse (rear left) | Pulse from wheel speed sensor (Rear Left Wheel) | Applied | — |
| Wheel rotation direction (Rear left) | Rotation direction of wheel (Rear Left) | Applied | — |
| Wheel speed pulse (near right) | Pulse from wheel speed sensor (Rear Right Wheel) | Applied | — |
| Wheel rotation direction (Rear right) | Rotation direction of wheel (Rear Right) | Applied | — |
| Traveling direction | Moving direction of vehicle | Applied | 4.1.2.1 4.1.2.3 |
| Vehicle velocity | Estimated longitudinal velocity of vehicle | Applied | 4.1.2.2 |
| Longitudinal acceleration | Estimated longitudinal acceleration of vehicle | Applied | — |
| Lateral acceleration | Sensor value of lateral acceleration of vehicle | Applied | — |
| Yawrate | Sensor value of Yaw rate | Applied | — |
| Slipping Detection | Detection of tire glide/spin/skid | Applied | — |
| Vehicle mode state | State of whether Autonomous Mode, manual mode or others | Applied | 4.1.2.6 |
| Readiness for autonomization | Situation of whether the vehicle can transition to Autonomous Mode or not | Applied | 4.1.2.6 |
| Failure status of VP functions for Autonomous Mode | This signal is used to show whether VP functions have some failures mode when a vehicle works as Autonomous Mode. | Applied | — |
| PCS Alert Status | Status of PCS (Alert) | N/A | — |
| PCS Preparation Status | Status of PCS (Prefill) | N/A | — |
| PCS Brake/PCS Brake Hold Status | Status of POS (PB/PBH) | N/A | — |
| ADS/PCS arbitration status | ADS/PCS arbitration status | N/A | — |

4.1.2. API guides in Details for Vehicle Motion Control

4.1.2.1. Propulsion Direction Command

Please refer to 3.2.2.1 for value and remarks in detail.

Figure 21:
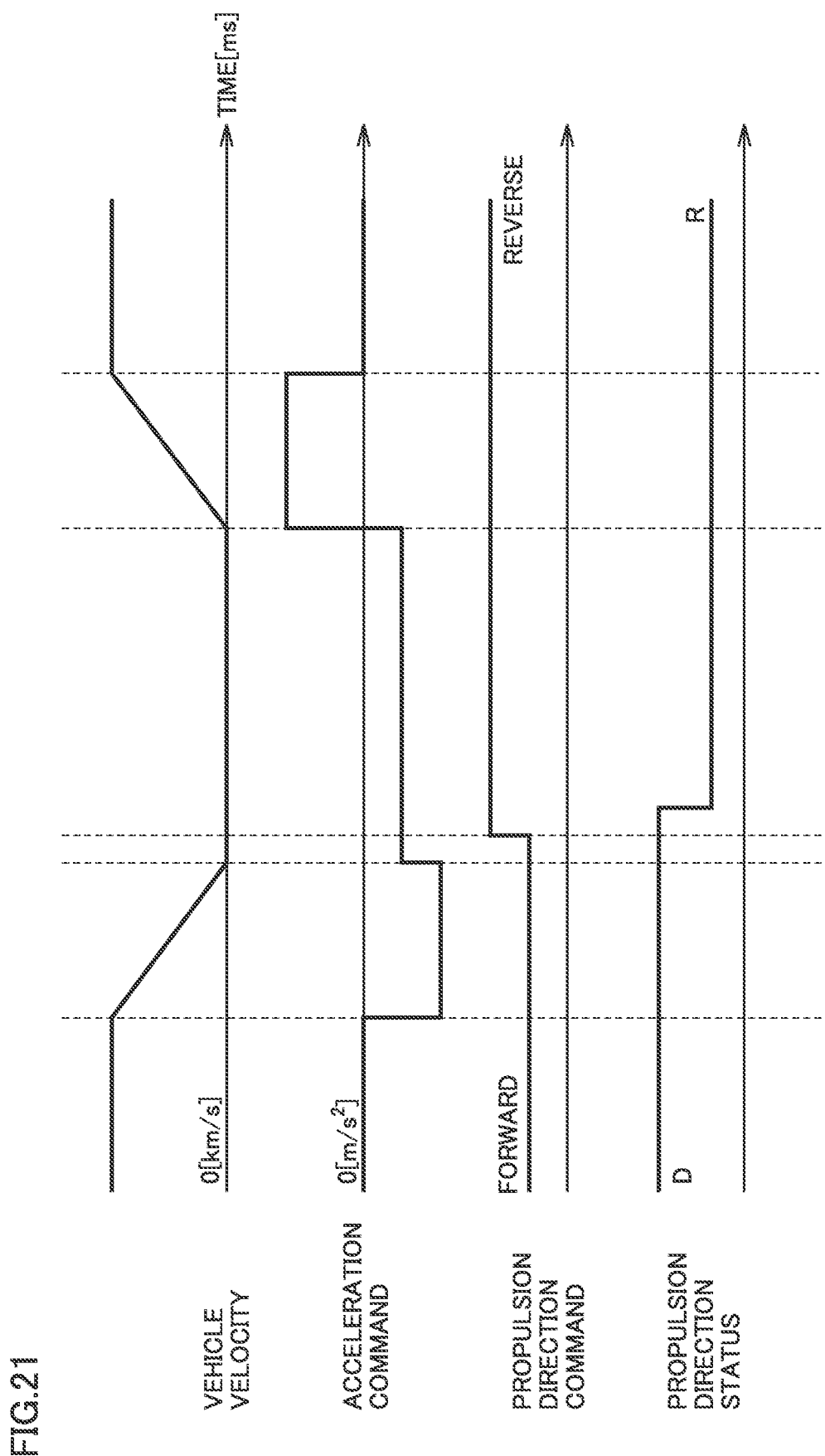
FIG. 21 is a diagram showing details of shift change sequences.

FIG. 21 shows shift change sequences in detail.

First deceleration is requested by Acceleration Command and the vehicle is stopped. When Traveling direction is set to "standstill", any shift position can be requested by Propulsion Direction Command. (In FIG. 21, "D"->"R").

Deceleration has to be requested by Acceleration Command until completing shift change.

After shift position is changed, acceleration/deceleration can be chosen based on Acceleration Command.

While Vehicle mode state=Autonomous Mode, driver's shift lever operation is not accepted.

4.1.2.2. Immobilization Command

Please refer to 3.2.2.2 for value and remarks in detail.

Figure 22:
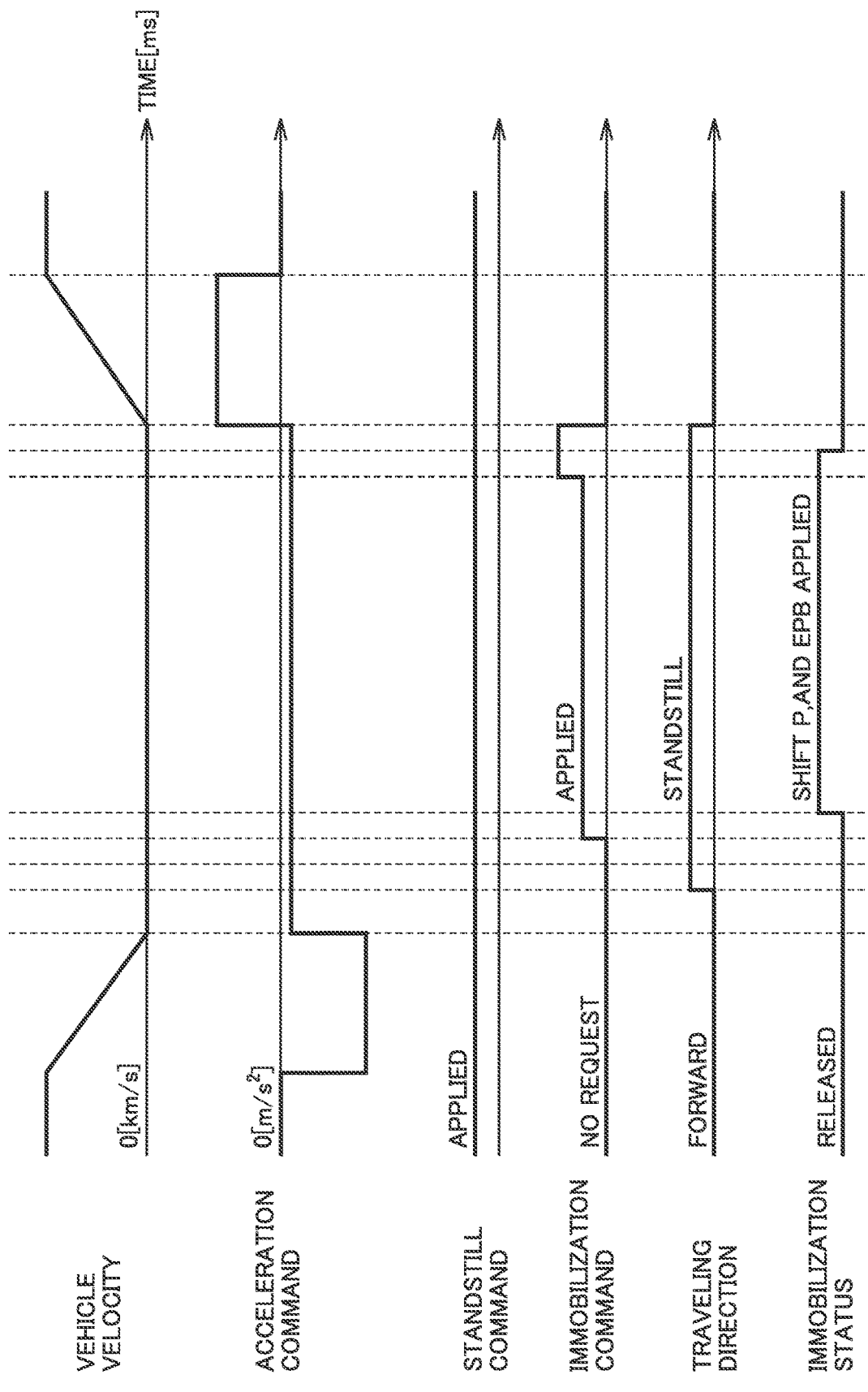
FIG. 22 is a diagram showing immobilization sequences.

FIG. 22 shows how to activate/deactivate immobilization function.

Deceleration is requested with Acceleration Command to make a vehicle stop. When Vehicle velocity goes to zero, Immobilization function is activated by Immobilization Command="Applied". Acceleration Command is set to Deceleration until Immobilization Status is set to "Applied".

When deactivating Immobilization function, Immobilization Command="Released" has to be requested and simultaneously Acceleration Command has to be set as deceleration until confirming Immobilization Status="Released".

After Immobilization function is deactivated, the vehicle can be accelerated/decelerated based on Acceleration Command.

4.1.2.3. Standstill Command

Please refer to 3.2.2.3 for value and remarks in detail.

In case where Standstill Command is set as "Applied", brakehold function can be ready to be used and brakehold function is activated in a condition where a vehicle stops and Acceleration Command is set as Deceleration (<0). And then Standstill Status is changed to "Applied". On the other hand, in case where Standstill Command is set as "Released", brakehold function is deactivated.

Figure 23:
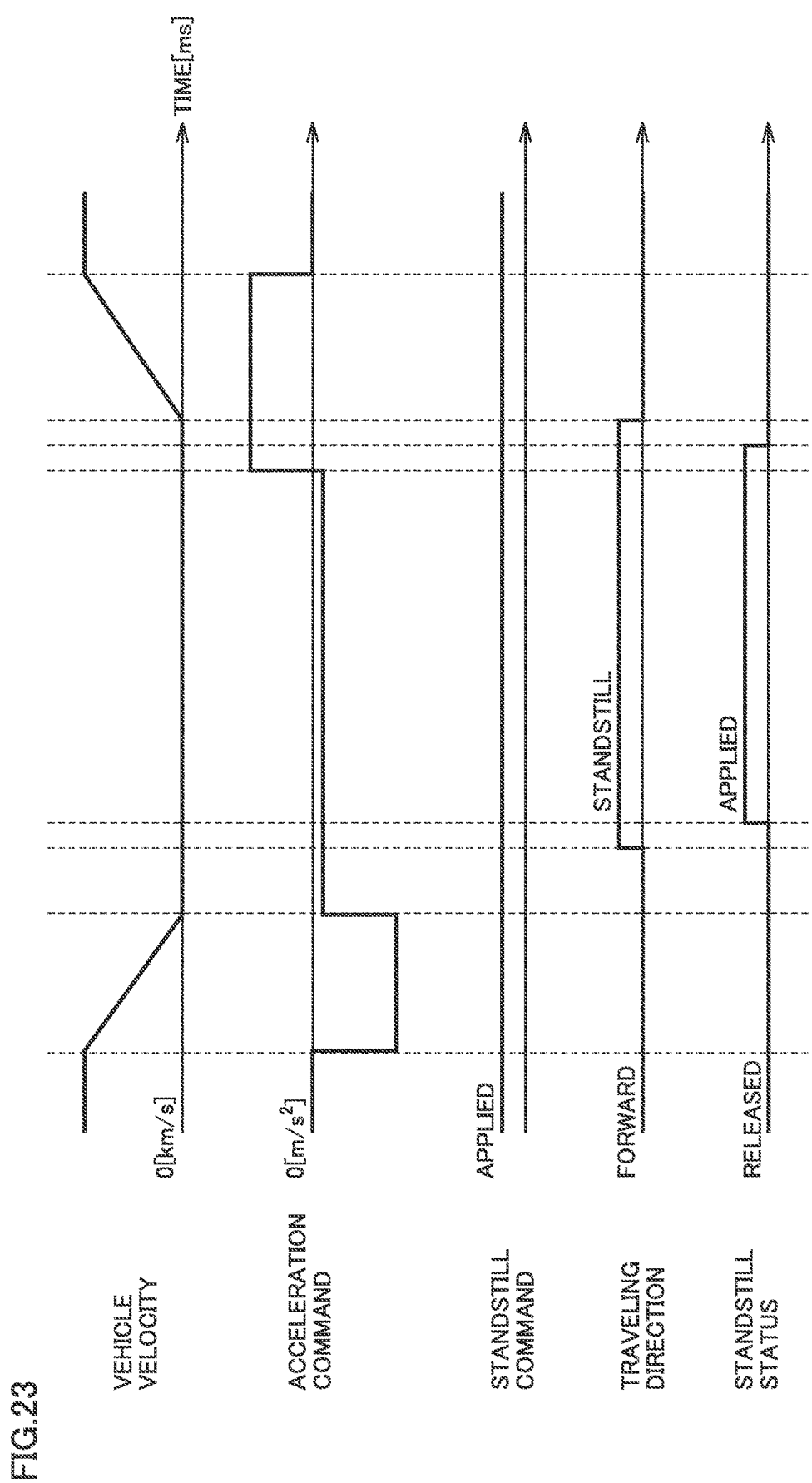
FIG. 23 is a diagram showing standstill sequences.

FIG. 23 shows standstill sequences.

To make a vehicle stop, deceleration is requested with Acceleration Command.

When the vehicle stops for a while, Traveling direction is changed to "standstill". Even during Standstill status="Applied", deceleration shall be requested with Acceleration Command.

If you want the vehicle to move forward, Acceleration Command is set as Acceleration (>0). Then brake hold function is released and the vehicle is accelerated.

4.1.2.4. Acceleration Command

Please refer to 3.2.2.4 for value and remarks in detail.

The below shows how a vehicle behaves when an acceleration pedal is operated.

In case where the accelerator pedal is operated, a maximum acceleration value of either 1) one calculated from accelerator pedal stroke or 2) Acceleration Command input from ADK is chosen. ADK can see which value is selected by checking Intervention of accelerator pedal.

The below shows how a vehicle behaves when a brake pedal is operated.

Deceleration value in the vehicle is the sum of 1) one calculated from the brake pedal stroke and 2) one requested from ADK.

4.1.2.5. Front Wheel Steer Angle Command

Please refer to 3.2.2.5 for value and remarks in detail.

The below shows the way of using Front Wheel Steer Angle Command.

Front Wheel Steer Angle Command is set as a relative value from Front wheel steer angle.

For example, in case where Front wheel steer angle=0.1 [rad] and a vehicle goes straight;

If ADK would like to go straight, Front Wheel Steer Angle Command should be set to 0+0.1=0.1[rad].

If ADK requests to steer by −0.3 [rad], Front Wheel Steer Angle Command should be set to −0.3+0.1=−0.2 [rad].

The below shows how a vehicle behaves when a driver operates the steering.

A maximum value is selected either from 1) one calculated from steering wheel operation by the driver or 2) one requested by ADK.

Note that Front Wheel Steer Angle Command is not accepted if the driver strongly operates the steering wheel. This situation can be found by Intervention of steering wheel flag.

4.1.2.6. Vehicle Mode Command

Figure 24:
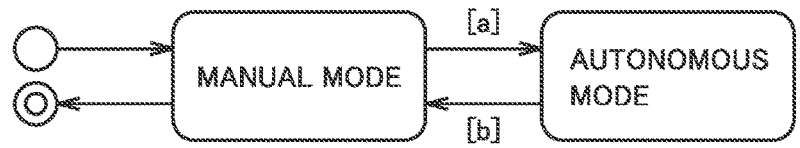
FIG. 24 is a state machine diagram of an autonomy state.

The state machine of mode transition for Autono-MaaS vehicle is shown in FIG. 24.

The explanation of each state is shown as follows.

| State | Description |
|---|---|
| Manual | A vehicle begins with this state and is under a control of a human driver. ADK cannot give any controls (except some commands) to VP. Power mode status and Vehicle mode state are in the followings: Power mode status = Wake or Drive Vehicle mode state = Manual Mode |
| Autonomy | ADK can communicate to VP after authentication is successful. VP is under the control of the ADK as a result of being issued "Request for Autonomy." Power mode status and Vehicle mode state are in the followings: Power mode status = Drive Vehicle mode state = Autonomous Mode |

The explanation of each transition is shown as follows.

| Transition | Conditions |
|---|---|
| a | When the following conditions are established, the mode will be transitioned from Manual to Autonomy: The ADK is authenticated, Power mode status = Drive, Readiness for autonomization = Ready For Autonomy Vehicle Mode Command = Request For Autonomy. |
| b | When the following conditions are established, the mode will be transitioned from Autonomy to Manual: Vehicle Mode Command = Deactivation Request. |

4.2. APIs for BODY Control 4.2.1. API List for BODY Control 4.2.1.1. Inputs

TABLE 16

Input APIs for BODY Control

| Signal Name | Description | Redundancy | Usage Guide |
|---|---|---|---|
| Turnsignal command | Command to control the turnsignallight mode of the vehicle platform | N/A | — |
| Headlight command | Command to control the headlight mode of the vehicle platform | N/A | — |
| Hazardlight command | Command to control the hazardlight mode of the vehicle platform | N/A | — |
| Horn pattern command | Command to control the pattern of horn ON-time and OFF-time per cycle of the vehicle platform | N/A | — |
| Horn cycle command | Command to control the number of horn ON/OFF cycles of the vehicle platform | N/A | — |
| Continuous horn command | Command to control of horn ON of the vehicle platform | N/A | — |
| Front windshield wiper command | Command to control the front windshield wiper of the vehicle platform | N/A | — |
| Rear windshield wiper command | Command to control the rear windshield wiper mode of the vehicle platforms | N/A | — |
| HVAC (1st row) operation command | Command to start/stop 1st row air conditioning control | N/A | — |
| HVAC (2nd row) operation command | Command to start/stop 2nd row air conditioning control | N/A | — |
| Target temperature (1st left) command | Command to set the target temperature around front left area | N/A | — |
| Target temperature (1st right) command | Command to set the target temperature around front right area | N/A | — |
| Target temperature (2nd left) command | Command to set the target temperature around rear left area | N/A | — |
| Target temperature (2nd right) command | Command to set the target temperature around rear right area | N/A | — |
| HVAC fan (1st row) command | Command to set the fan level on the front AC | N/A | — |

TABLE 16-continued

Input APIs for BODY Control

| Signal Name | Description | Redundancy | Usage Guide |
|---|---|---|---|
| HVAC fan (2nd row) command | Command to set the fan level on the rear AC | N/A | — |
| Air outlet (1st row) command | Command to set the mode of 1st row air outlet | N/A | — |
| Air outlet (2nd row) command | Command to set the mode of 2nd row air outlet | N/A | — |
| Air recirculation command | Command to set the air recirculation mode | N/A | — |
| AC mode command | Command to set the AC mode | N/A | — |

4.2.1.2. Outputs

TABLE 17

Output APIs for BODY Control

| Signal Name | Description | Redundancy | Usage Guide |
|---|---|---|---|
| Turnsignal status | Status of the current turnsignallight mode of the vehicle platform | N/A | — |
| Headlight status | Status of the current headlight mode of the vehicle platform | N/A | — |
| Hazardlight status | Status of the current hazardlight mode of the vehicle platform | N/A | — |
| Horn status | Status of the current horn of the vehicle platform | N/A | — |
| Front windshield wiper status | Status of the current front windshield wiper mode of the vehicle platform | N/A | — |
| Rear windshield wiper status | Status of the current rear windshield wiper mode of the vehicle platform | N/A | — |
| HVAC (1st row) status | Status of activation of the $1^{st}$ row HVAC | N/A | — |
| HVAC (2nd row) status | Status of activation of the $2^{nd}$ row HVAC | N/A | — |
| Target temperature (1st left) status | Status of set temperature of $1^{st}$ row left | N/A | — |
| Target temperature (1st right) status | Status of set temperature of $1^{st}$ row right | N/A | — |
| Target temperature (2nd left) status | Status of set temperature of $2^{nd}$ row left | N/A | — |
| Target temperature (2nd right) status | Status of set temperature of $2^{nd}$ row right | N/A | — |
| HVAC fan (1st row) status | Status of set fan level of $1^{st}$ row | N/A | — |
| HVAC fan (2nd row) status | Status of set fan level of $2^{nd}$ row | N/A | — |
| Air outlet (1st row) status | Status of mode of 1st row air outlet | N/A | — |
| Air outlet (2nd row) status | Status of mode of 2nd row air outlet | N/A | — |
| Air recirculation status | Status of set air recirculation mode | N/A | — |
| AC mode status | Status of set AC mode | N/A | — |
| Seat occupancy (1st right) status | Seat occupancy status in 1st left seat | N/A | — |
| Seat belt (1st left) status | Status of driver's seat belt buckle switch | N/A | — |
| Seat belt (1st right) status | Status of passenger's seat belt buckle switch | N/A | — |
| Seat belt (2nd left) status | Seat belt buckle switch status in 2nd left seat | N/A | — |
| Seat belt (2nd right) status | Seat belt buckle switch status in 2nd right seat | N/A | — |

4.3. APIs for Power Control
4.3.1. API List for Power Control
4.3.1.1. Inputs

TABLE 18

Input APIs for Power Control

| Signal Name | Description | Redundancy | Usage Guide |
|---|---|---|---|
| Power mode command | Command to control the power mode of VP | N/A | — |

4.3.1.2. Outputs

TABLE 19

Output APIs for Power Control

| Signal Name | Description | Redundancy | Usage Guide |
|---|---|---|---|
| Power mode status | Status of the current power mode of VP | N/A | — |

4.4. APIs for Failure Notification
4.4.1. API List for Failure Notification
4.4.1.1. Inputs

TABLE 20

Input APIs for Failure Notification

| Signal Name | Description | Redundancy | Usage guide |
|---|---|---|---|
| N/A | — | — | — |

4.4.1.2. Outputs

TABLE 21

Output APIs for Failure Notification

| Signal Name | Description | Redundancy | Usage guide |
|---|---|---|---|
| Request for ADS Operation | — | Applied | — |
| Impact detection signal | — | N/A | — |
| Performance deterioration of Brake system | — | Applied | — |
| Performance deterioration of Propulsion system | — | N/A | — |
| Performance deterioration of Shift control system | — | N/A | — |
| Performance deterioration of immobilization system | — | Applied | — |
| Performance deterioration of Steering system | — | Applied | — |
| Performance deterioration of Power supply system | — | Applied | — |
| Performance deterioration of Communication system | — | Applied | — |

4.5. APIs for Security
4.5.1. API List for Security

Input and output APIs for Security are shown in Table 22 and Table 23, respectively. Usage guides of some APIs are presented in the following sections as indicated in each table.

4.5.1.1. Inputs

TABLE 22

Input APIs for Security

| Signal Name | Description | Redundancy | Usage Guide |
|---|---|---|---|
| Door Lock (front) command | Command to control 1st both doors lock | N/A | — |
| Door Lock (rear) command | Command to control 2nd both doors and trunk lock | N/A | — |
| Central door lock command | Command to control the all door lock | N/A | — |
| Device Authentication Signature the 1st word | This is the 8th byte from the 1st byte of the Signature value. | N/A | 4.5.2.1 |
| Device Authentication Signature the 2nd word | This is the 16th byte from the 9th byte of the Signature value. | N/A | 4.5.2.1 |
| Device Authentication Signature the 3rd word | This is the 24th byte from the 17th byte of the Signature value. | N/A | 4.5.2.1 |
| Device Authentication Signature the 4th word | This is the 32th byte from the 25th byte of the Signature value. | N/A | 4.5.2.1 |

4.5.1.2. Outputs

TABLE 23

Output APIs for Security

| Signal Name | Description | Redundancy | Usage Guide |
|---|---|---|---|
| Door lock (1st left) status | Status of the current 1st-left door lock | N/A | — |
| Door lock (1st right) status | Status of the current 1st-right door lock | N/A | — |
| Door lock (2nd left) status | Status of the current 2nd-left door lock | N/A | — |
| Door lock (2nd right) status | Status of the current 2nd-right door lock | N/A | — |
| Central door lock status | Status of the current all door lock | N/A | — |
| Alarm system status | Status of the current vehicle alarm | N/A | — |
| Device Authentication Seed the 1st word | This is the 8th byte from the 1st byte of the Seed value. | N/A | — |
| Device Authentication Seed the 2nd word | This is the 16th byte from the 9th byte of the Seed value. | N/A | — |
| Trip Counter | This counter is incremented in units of trips by the Freshness Value management master ECU. | N/A | — |
| Reset Counter | This counter is incremented periodically by the Freshness Value management master ECU. | N/A | — |
| 1st Left Door Open Status | Status of the current 1st-left door open/close of the vehicle platform | N/A | — |
| 1st Right Door Open Status | Status of the current 1st-right door open/close of the vehicle platform | N/A | — |
| 2nd Left Door Open Status | Status of the current 2nd-left door open/close of the vehicle platform | N/A | — |
| 2nd Right Door Open Status | Status of the current 2nd-right door open/close of the vehicle platform | N/A | — |
| Trunk Status | Status of the current trunk door open of the vehicle platform | N/A | — |
| Hood Open Status | Status of the current hood open/close of the vehicle platform | N/A | — |

4.5.2. API guides in Details for Security
4.5.2.1. Device Authentication Protocol Device authentication is applied when the VCIB is activated from "Sleep" mode.

After the authentication succeeds, the VCIB can start to communicate with ADK.

Figure 25:
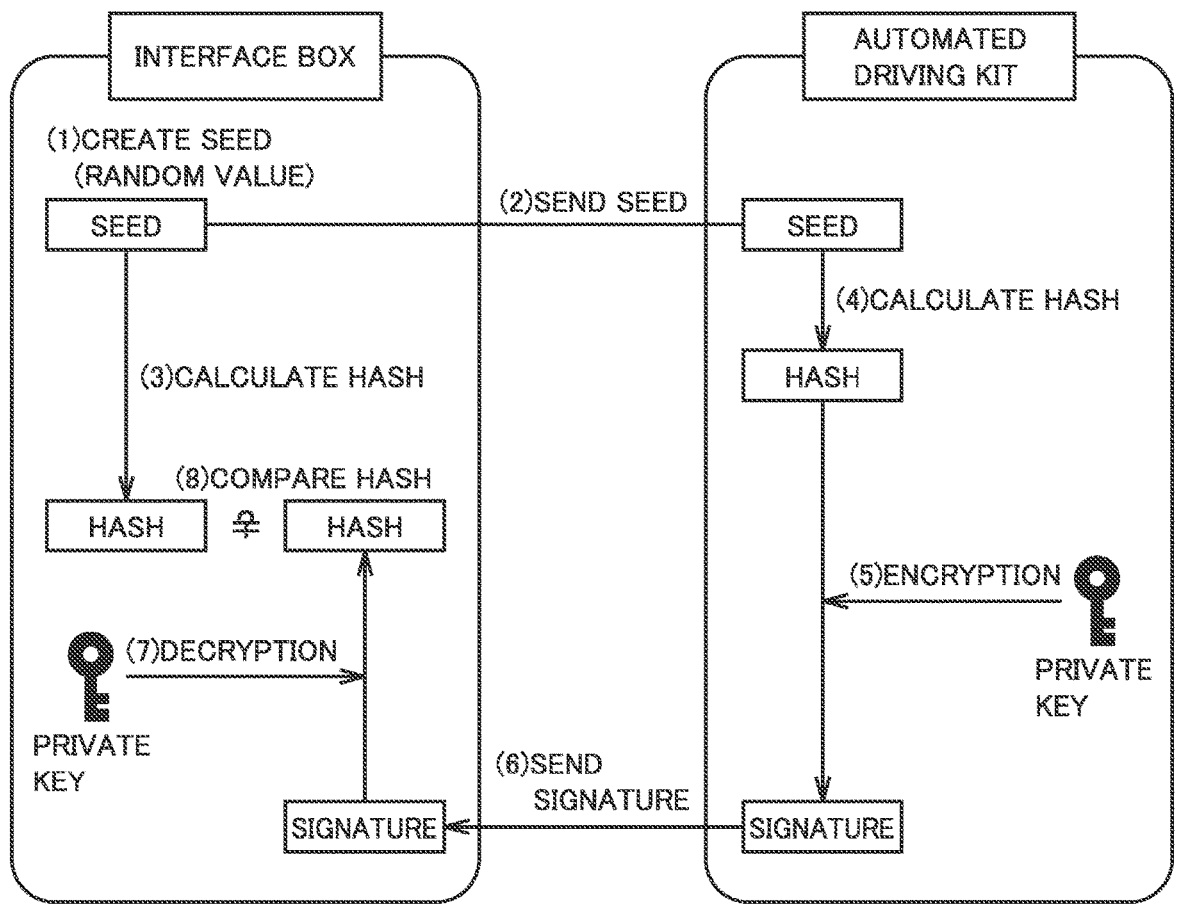
FIG. 25 is a diagram showing an authentication process.

Authentication process is as shown in FIG. 25 Authentication Process.

| Authentication Specification | | |
|---|---|---|
| Item | Specification | Note |
| Encryption algorithms | AES | FIPS 197 |
| Key length | 128 bit | — |
| Block cipher modes of operation | CBC | SP 800-38A |
| Hash algorithms | SHA-256 | FIPS 180-4 |
| Seed length | 128 bit | — |
| Signature length | 256 bit | — |

Though an embodiment of the present disclosure has been described above, it should be understood that the embodiment disclosed herein is illustrative and non-restrictive in every respect. The technical scope in the present disclosure is defined by the terms of the claims and is intended to include any modifications within the scope and meaning equivalent to the terms of the claims.

What is claimed is:

1. A vehicle comprising:
a vehicle platform; and
an autonomous driving system is mounted on the vehicle platform, the vehicle platform including:
a base vehicle; and
a vehicle control interface box that interfaces between the base vehicle and the autonomous driving system through a main bus and a sub bus, wherein
the base vehicle includes a vehicle-mounted system connected to the vehicle control interface box,
the vehicle control interface box includes
a main vehicle control interface box that interfaces between the base vehicle and the autonomous driving system through the main bus, and
a sub vehicle control interface box that interfaces between the base vehicle and the autonomous driving system through the sub bus,
each of the main vehicle control interface box and the sub vehicle control interface box outputs a first signal and a second signal to the autonomous driving system,
the first signal indicates a status as to whether a fault regarding a functionality in an autonomous mode in the vehicle platform occurs,
the second signal indicates a status of the vehicle-mounted system according to a failure point in the vehicle platform, and
the vehicle-mounted system is a wheel lock control system, a direction control system, or a propulsive system of the base vehicle.

2. The vehicle according to claim 1, wherein
the vehicle-mounted system is the wheel lock control system,
the wheel lock control system includes an electric parking brake system and a parking lock system of the vehicle,
the parking lock system is connected to the sub vehicle control interface box, and
the status of the wheel lock control system indicated by the second signal includes loss of a function of the wheel lock control system, a degraded operation of the electric parking brake system, and a degraded operation of the parking lock system.

3. The vehicle according to claim 2, wherein
the base vehicle further includes a motion controller that communicates with each of the main vehicle control interface box, the sub vehicle control interface box, the electric parking brake system, and the parking lock system, the main vehicle control interface box is configured to communicate with each of the electric parking brake system and the parking lock system with the motion controller being interposed, the status of the wheel lock control system indicated by the second signal outputted from the main vehicle control interface box is the loss of the function when the failure point is located on a communication path between the main vehicle control interface box and the motion controller or in the motion controller, the degraded operation of the parking lock system when the failure point is located on a communication path between the motion controller and the parking lock system or in the parking lock system, or the degraded operation of the electric parking brake system when the failure point is located in the electric parking brake system.

4. The vehicle according to claim 2, wherein the base vehicle further includes a motion controller that communicates with each of the main vehicle control interface box, the sub vehicle control interface box, the electric parking brake system, and the parking lock system, the sub vehicle control interface box is configured to communicate with each of the electric parking brake system and the parking lock system with the motion controller being interposed, and the status of the wheel lock control system indicated by the second signal outputted from the sub vehicle control interface box is the degraded operation of the electric parking brake system when the failure point is located in the motion controller, on a communication path between the sub vehicle control interface box and the motion controller, or in the electric parking brake system, or the degraded operation of the parking lock system when the failure point is located in the parking lock system or on a communication path between the sub vehicle control interface box and the parking lock system.

5. The vehicle according to claim 1, wherein the autonomous driving system determines a location of the failure point based on both the first signal and the second signal from the main vehicle control interface box and the first signal and the second signal from the sub vehicle control interface box.

6. A vehicle control interface box that interfaces between a base vehicle included in a vehicle platform configured such that an autonomous driving system is mountable on the vehicle platform and the autonomous driving system through a main bus and a sub bus, the base vehicle including a vehicle-mounted system connected to the vehicle control interface box, the vehicle control interface box comprising:

a main vehicle control interface box that interfaces between the base vehicle and the autonomous driving system through the main bus; and a sub vehicle control interface box that interfaces between the base vehicle and the autonomous driving system through the sub bus, wherein each of the main vehicle control interface box and the sub vehicle control interface box outputs a first signal and a second signal to the autonomous driving system, the first signal indicates a status as to whether a fault regarding a functionality in an autonomous mode in the vehicle platform occurs, the second signal indicates a status of the vehicle-mounted system according to a failure point in the vehicle platform, and the vehicle-mounted system is a wheel lock control system, a direction control system, or a propulsive system of the base vehicle.

* * * * *